(12) United States Patent
Hamaoka et al.

(10) Patent No.: US 8,006,718 B2
(45) Date of Patent: Aug. 30, 2011

(54) ELECTRIC SPOOL VALVE

(75) Inventors: Yasuhiro Hamaoka, Kariya (JP); Jiro Kondo, Kariya (JP)

(73) Assignee: Denso Corporation, Kariya (JP)

( * ) Notice: Subject to any disclaimer, the term of this patent is extended or adjusted under 35 U.S.C. 154(b) by 728 days.

(21) Appl. No.: 12/132,284

(22) Filed: Jun. 3, 2008

(65) Prior Publication Data
US 2008/0315140 A1    Dec. 25, 2008

(30) Foreign Application Priority Data

Jun. 21, 2007  (JP) ................................. 2007-164296
Sep. 4, 2007  (JP) ................................. 2007-229399

(51) Int. Cl.
*F16K 31/06* (2006.01)
(52) U.S. Cl. ......... 137/625.65; 137/625.25; 137/625.67; 137/625.34; 137/315.04; 137/315.27
(58) Field of Classification Search ............. 137/625.65, 137/625.25, 625.67, 625.68, 625.69, 625.34, 137/625.35, 315.04, 315.27
See application file for complete search history.

(56) References Cited

U.S. PATENT DOCUMENTS

| | | | | |
|---|---|---|---|---|
| 5,878,782 A * | 3/1999 | Nakajima | ................ | 137/625.65 |
| 6,681,806 B2 * | 1/2004 | Isobe | ..................... | 137/625.65 |
| 6,688,334 B2 * | 2/2004 | Kawamura et al. | ...... | 137/625.65 |
| 6,883,544 B2 * | 4/2005 | Kawamura et al. | ...... | 137/625.65 |
| 6,968,816 B2 * | 11/2005 | Isobe et al. | ................. | 123/90.17 |
| 7,017,885 B2 * | 3/2006 | Hirata et al. | ............. | 251/129.15 |
| 7,131,410 B2 * | 11/2006 | Kondo et al. | ............. | 123/90.17 |
| 2005/0178451 A1 * | 8/2005 | Inami | ....................... | 137/625.65 |

FOREIGN PATENT DOCUMENTS

| | | |
|---|---|---|
| JP | 7-8677 | 2/1995 |
| JP | 9-60757 | 3/1997 |
| JP | 2003-97756 | 4/2003 |
| JP | 2003-214552 | 7/2003 |
| JP | 2005-233282 | 9/2005 |

OTHER PUBLICATIONS

Japanese Office Action dated Aug. 18, 2009, issued in corresponding Japanese Application No. 2007-229399, with English Translation.

* cited by examiner

*Primary Examiner* — Stephen M Hepperle
*Assistant Examiner* — Minh Le
(74) *Attorney, Agent, or Firm* — Nixon & Vanderhye PC

(57) ABSTRACT

A sleeve has an input port, an output port, an insertion hole, and only one discharge port. A spool is axially slidable through the insertion hole to communicate among the input port, the output port, and the discharge port. An electric actuator is provided to one end of the sleeve and has a variable volume chamber, which communicates with the discharge port through an axial through hole and a spool breathing hole in the spool. The spool has a communication through hole to lead fluid from the output port to the discharge port through the axial through hole. A passage partition member is in the axial through hole to define an in-spool breathing passage communicating with the spool breathing hole.

16 Claims, 12 Drawing Sheets

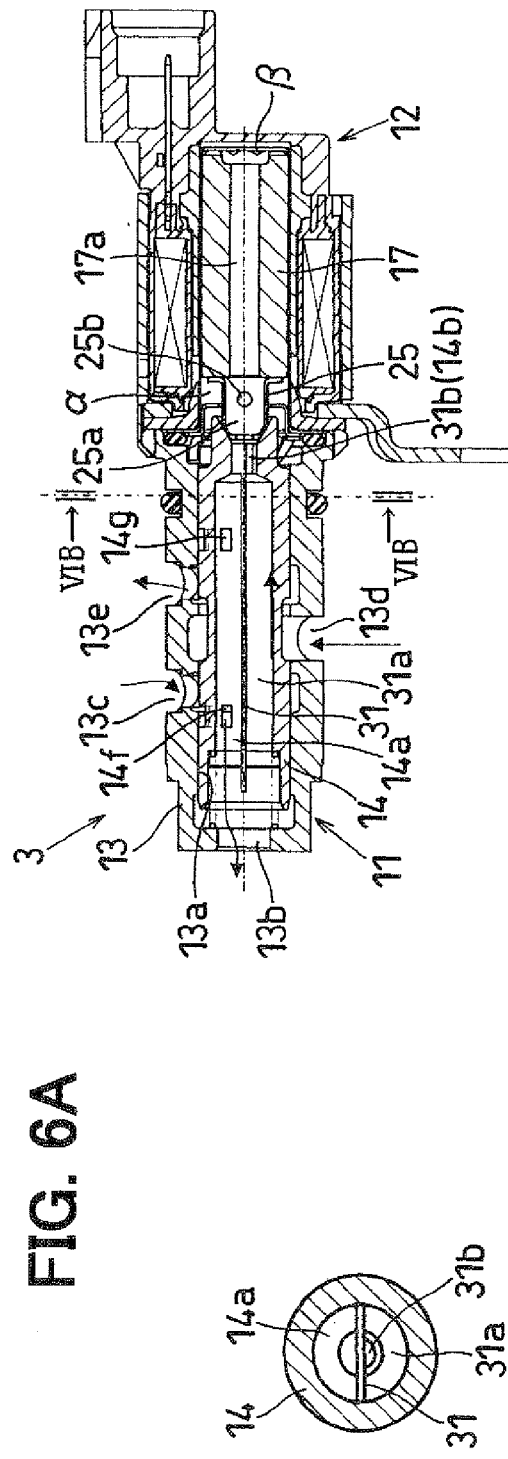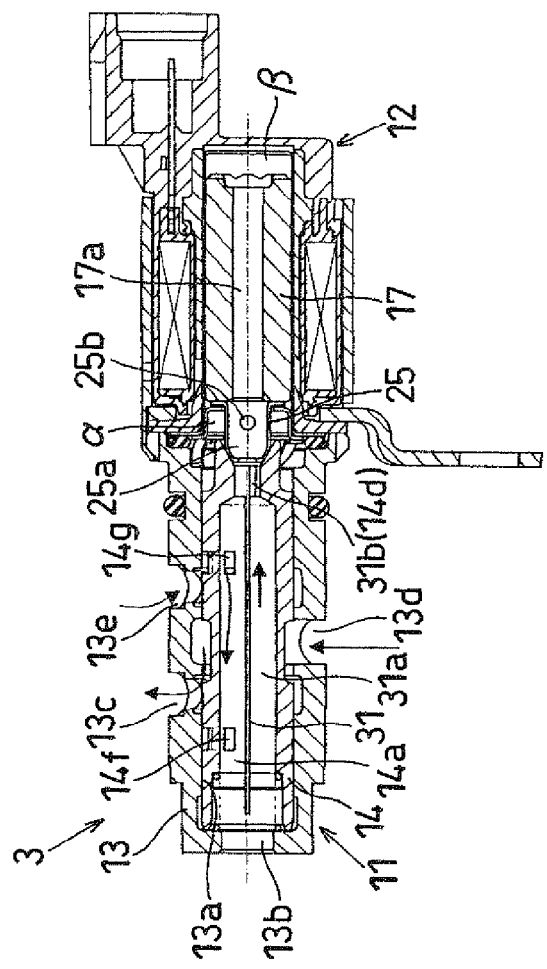
FIG. 6A
FIG. 6B
FIG. 6C

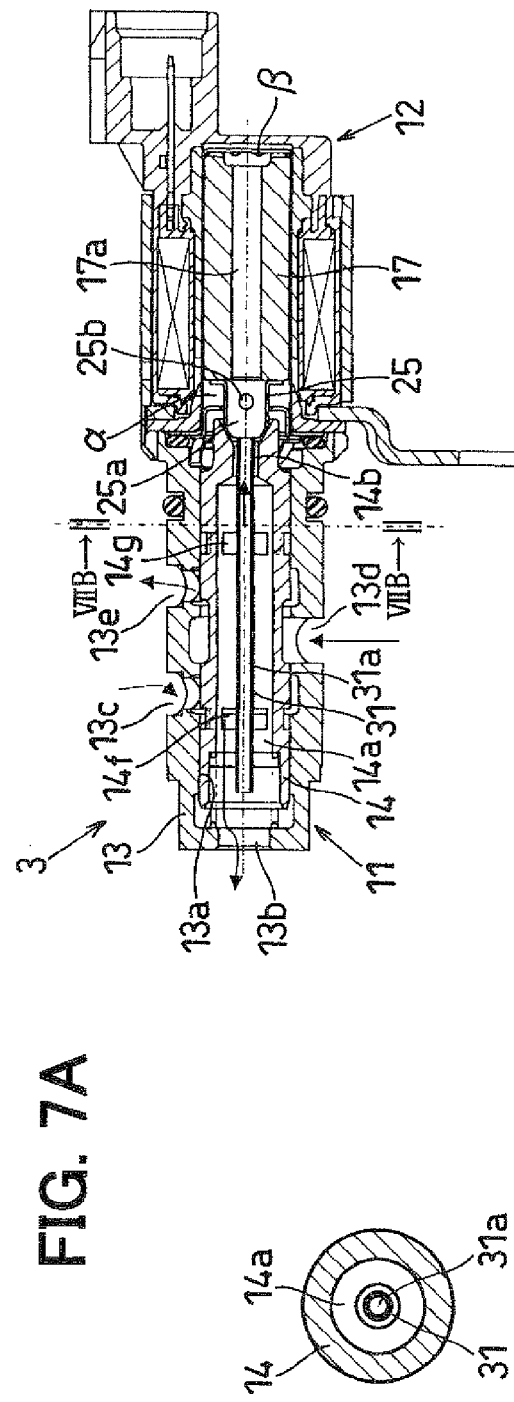
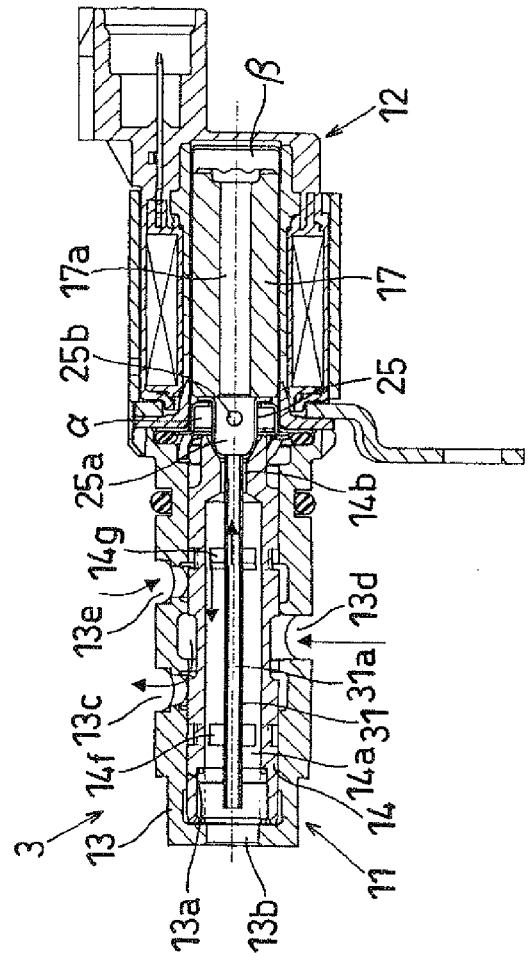
FIG. 7A
FIG. 7B
FIG. 7C

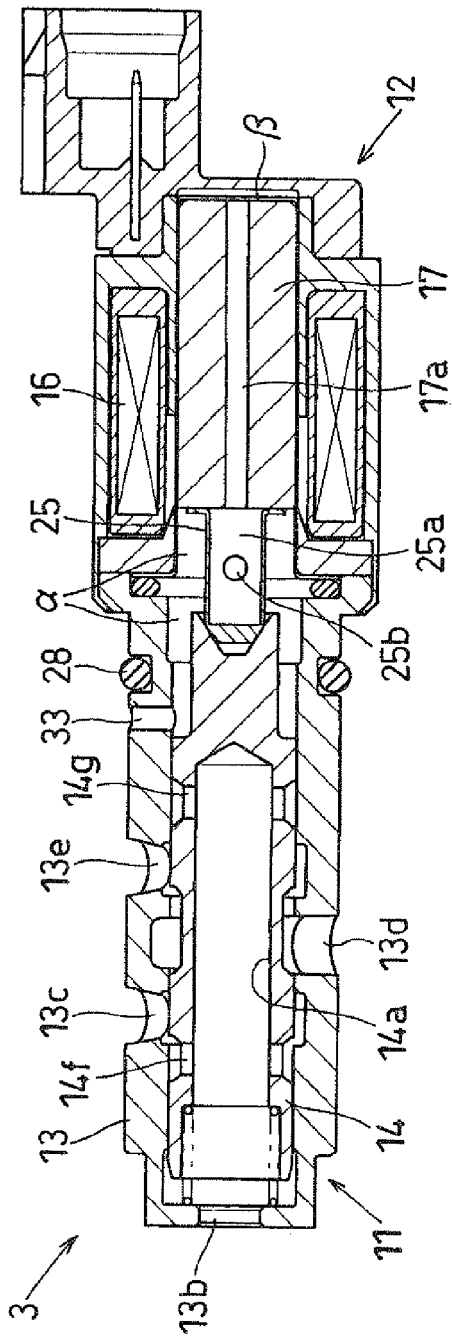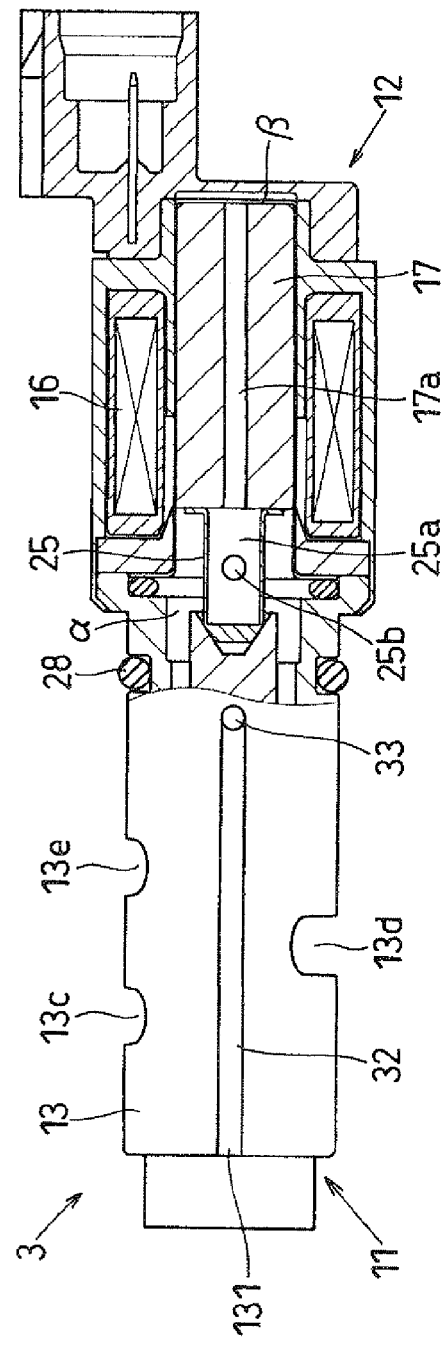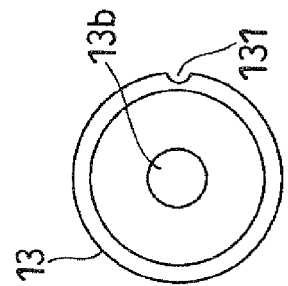

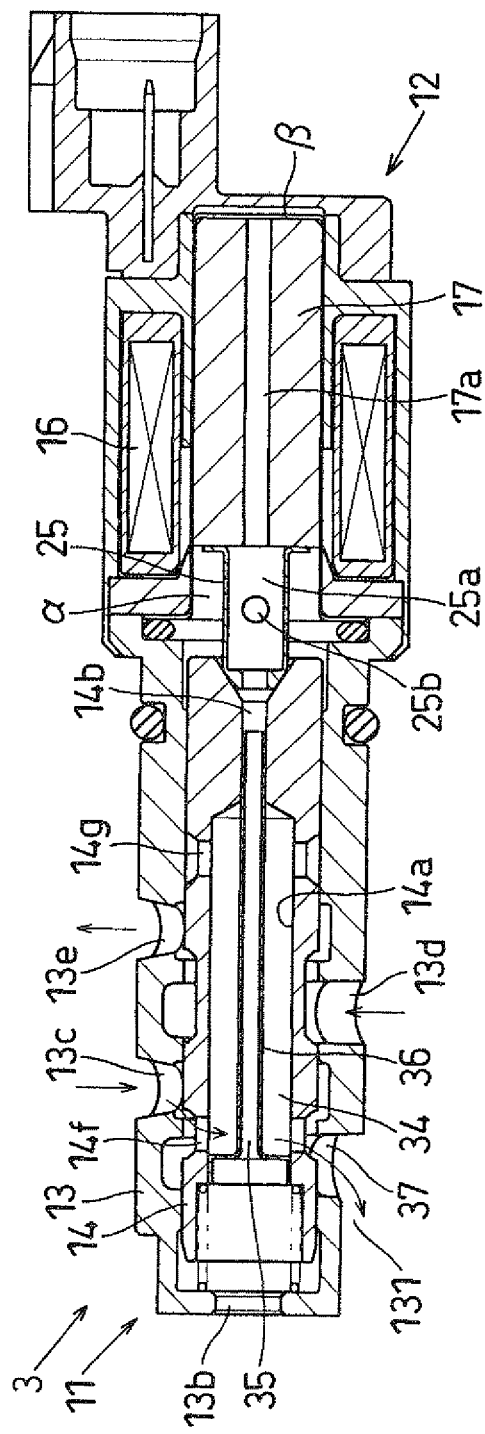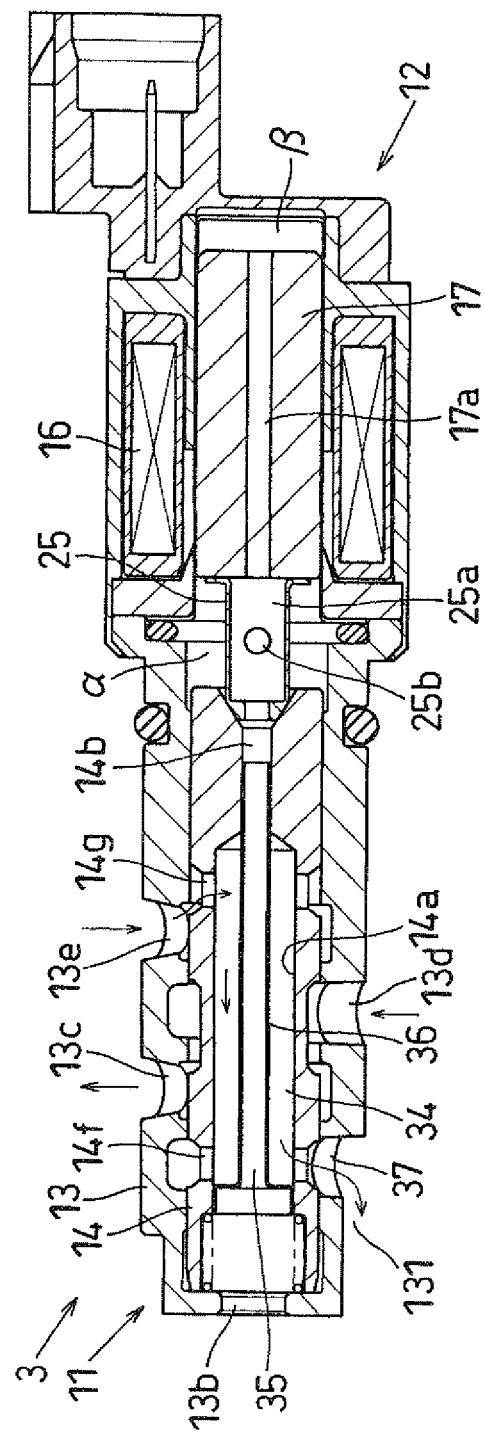
FIG. 11A
FIG. 11B

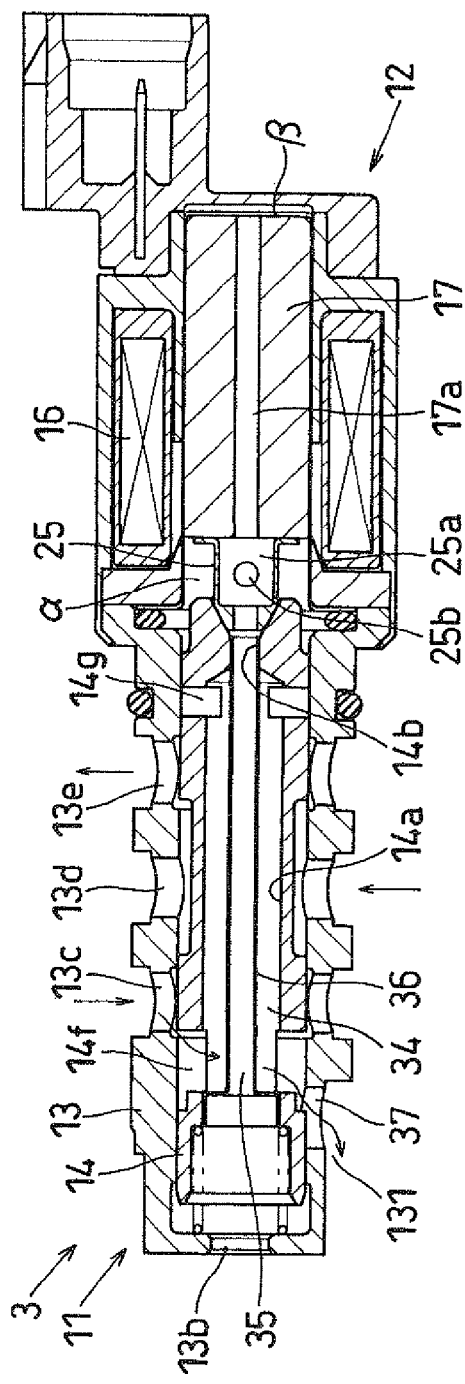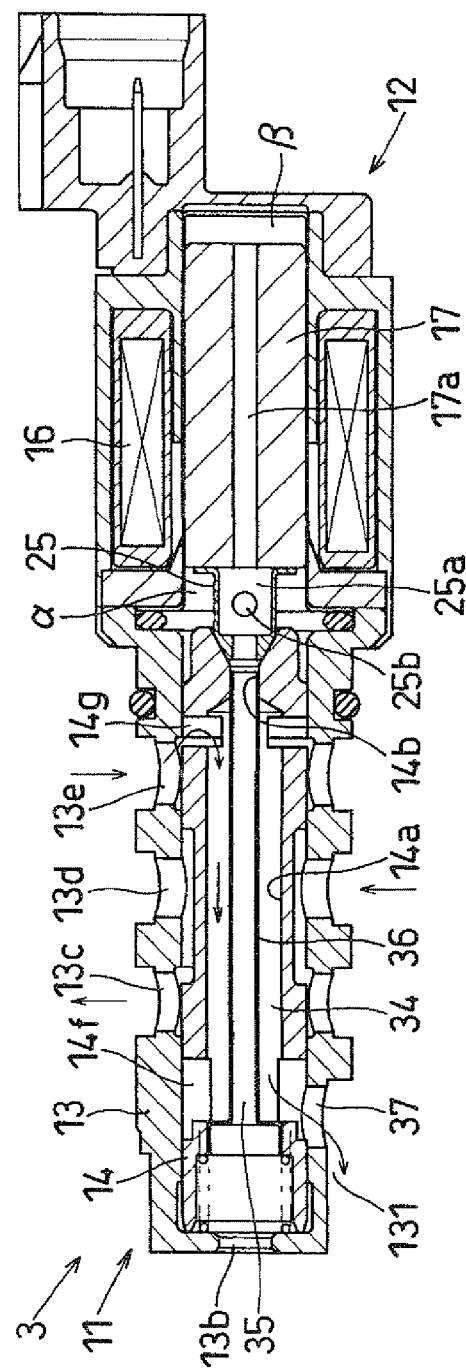

ELECTRIC SPOOL VALVE

CROSS REFERENCE TO RELATED APPLICATIONS

This application is based on and incorporates herein by reference Japanese Patent Applications No. 2007-164296 filed on Jun. 21, 2007 and No. 2007-229399 filed on Sep. 4, 2007.

FIELD OF THE INVENTION

The present invention relates to an electric spool valve.

BACKGROUND OF THE INVENTION

According to U.S. Pat. No. 6,968,816 B2 (JP-A-2005121136), a solenoid spool valve as one example of an electric spool valve is disclosed. The solenoid spool valve shown in the U.S. Pat. No. 6,968,816 B2 is a five-way solenoid spool valve as an oil flow control valve (OCV), which performs a hydraulic pressure control to advance and retard a valve timing of a camshaft of an internal combustion engine. The five-way solenoid spool valve has one input port, two output ports, and two discharge ports. The solenoid spool valve is used for a valve timing control apparatus (VVT) for manipulating an opening and dosing timing of at least one of an intake valve and an exhaust valve. The VVT includes a variable valve timing mechanism (VCT), a hydraulic circuit, and an engine control unit (ECU). The hydraulic circuit controls hydraulic pressure of the VCT to mechanically actuate the camshaft. The ECU electrically controls the OCV provided in the hydraulic circuit.

The OCV used for the VVT includes a spool valve and a solenoid actuator. The spool valve is constructed by combining the sleeve and the spool. The solenoid actuator is provided to one end of the spool valve to actuate the spool in the axial direction. The solenoid actuator is one example of an electric actuator. The sleeve is provided with one input port, an advance chamber output port, an retard chamber output port, an advance chamber discharge port, and an retard chamber discharge port. The advance chamber output port controls hydraulic pressure in an advance chamber. The retard chamber output port controls hydraulic pressure in a retard chamber. The advance chamber discharge port drains hydraulic pressure from the advance chamber. The retard chamber discharge port drains hydraulic pressure from the retard chamber. The solenoid actuator controls the axial position of the spool, thereby manipulating hydraulic pressure in the advance chamber output port and the retard chamber output port. Thus, the valve timing of the engine is controlled.

The solenoid actuator has an interior defining variable volume chambers, each having an inner volume, which is variable accompanied with an operation thereof. Specifically, the solenoid actuator has a first variable volume chamber and a second variable volume chamber. The first variable volume chamber is in the vicinity of the spool of the plunger. The second variable volume chamber is distant from the spool of the plunger. According to U.S. Pat. No. 6,968,816 B2, the first and second variable volume chambers in the solenoid actuator communicate with the outside of the solenoid actuator through a breathing hole, which is provided in the sleeve. In the present structure, the first and second variable volume chambers are variable in the inner volumes. The other end of the spool valve on the opposite side of the solenoid actuator has a spring chamber, which is surrounded by the sleeve and the spool. The spring chamber communicates with the outside through a breathing hole provided in the sleeve.

That is, the present conventional OCV used for the VVT is provided with two discharge ports and two breathing holes as discharge ports communicated with the exterior. The two discharge ports include an advance chamber discharge port and a retard chamber discharge port. The two breathing holes include the breathing holes for the solenoid actuator and the spring chamber.

(Problem)

In recent years, it is demanded to reduce the number of the discharge ports provided in the sleeve to one, so as to downsize the OCV in addition to simplifying the passage structure at the attachment side of the OCV to the engine. For example, an OCV may be provided with only one discharge port in an end of a sleeve on the opposite side from a solenoid actuator. Oil is discharged from the advance chamber and the retard chamber of the VCT and the oil is led into the in-spool axial through hole, which is provided in the spool. The spool breathing hole is provided to the one end of the in-spool axial through hole on the side of the solenoid actuator. In the present structure, engine oil, which is discharged from the advance chamber and the retard chamber of the VCT, may be led into the solenoid actuator through the spool breathing hole.

The discharge of the engine oil from the advance chamber and the retard chamber of the VCT is mainly accompanied with the operation of the VVT. Accordingly, a large amount of engine oil flows through a variable volume chamber in the solenoid actuator through the spool breathing hole. Consequently foreign matters contained in the engine oil may possibly intrude into the variable volume chamber. Thus, the engine oil may be easily led from the in-spool axial through hole into the first variable volume chamber through the spool breathing hole, accompanied with change in the volume in the first variable volume chamber. That is, foreign matters contained in oil may easily intrude into the variable volume chamber in the solenoid actuator. The variable volume chamber communicates with the sliding clearance between the spool and the plunger, for example. In the present structure, when foreign matters intrude into the variable volume chamber, the operation of the spool and the plunger may be disturbed.

Here, it is conceived to elongate the breathing passage so as to enlarge the inner volume of the breathing passage. In this case, the amount of oil, which is newly replaced, may be decreased, and intrusion of foreign mailers may be suppressed. However, in this case, the solenoid actuator may be increased in size by simply elongating the breathing passage, and consequently, downsizing required to the OCV cannot be attained.

Furthermore, the spool valve of the OCV is mounted to a cylinder head 200 a an engine, which is one example of a stationary member. Specifically, the OCV is mounted to the engine by inserting the spool valve from the exterior of the engine into the attachment hole, which is provided in the engine, and fixing the solenoid actuator to the outer surface of the engine. When the OCV is mounted to the engine, the spool valve is located at a prescribed position of the engine. Thus, the ports of the sleeve respectively communicate with the passages provided in the engine. Thus, the solenoid actuator is mounted in a state where being exposed to the exterior of the engine. As described above, the solenoid actuator is exposed to the exterior of the engine. Accordingly, the first and second variable volume chambers are hard to be communicated with the exterior of the solenoid actuator. Therefore, the first and second variable volume chambers need to be communicated with an oil releasing portion in the engine through an actuator breathing path, which is provided to the spool valve.

In recent years, according to JP-A-200397756, the front end of the spool valve is inserted to the engine and exposed to the oil releasing portion, which is located in the cylinder head of the engine, for example. In the present structure of JP-A-200397756, flow resistance of oil discharged from the OCV can be reduced, and the passage structure at the side of the engine, to which the OCV is mounted, can be simplified. In the present structure, in which the front end of the sleeve is exposed to the oil releasing portion, oil, which is discharged from the output port, needs to be exhausted from the front end of the sleeve to the oil releasing portion after passing through an oil discharging path, similarly to the structure in JP-A-200397756. The oil discharging path includes the in-spool axial hole, which is provided in the spool, and the front end center opening, which is provided in the center portion at the side of the front end of the sleeve.

However, in the present structure in JP-A-2003-97756, the actuator breathing path, which communicates the first and second variable volume chambers in the solenoid actuator with the low-pressure side, also passes through the in-spool axial hole provided in the spool. Accordingly, the actuator breathing path and the oil discharging path commonly shares the in-spool axial hole. Consequently engine oil, which is discharged from the advance chamber and the retard chamber of the VCT, may flow into the first and second variable volume chambers. Thus, foreign mailers, which is contained in the engine oil discharged from the VCT, may intrude into the first and second variable volume chambers through the in-spool axial hole to reach the slidable surface of the plunger. When the foreign matters contained in the engine oil reach the slidable surface of the plunger, the sliding property of the plunger gets may be impaired to cause malfunction and abrasion.

SUMMARY OF THE INVENTION

In view of the foregoing and other problems, it is an object of the present invention to produce an electric spool valve including an electric actuator having a variable volume chamber, into which foreign matters can be restricted from intruding.

According to one aspect of the present invention, an electric spool valve comprises a sleeve having an input port, an output port, and only one discharge port, the sleeve having an inner periphery defining an insertion hole. The electric spool valve further comprises a spool axially slidable along the inner periphery of the sleeve to control communication among the input port, the output port, and the discharge port. The electric spool valve further comprises an electric actuator provided to one end of the sleeve to axially exert driving force to the spool. The spool has an axial through hole, which axially extends through the spool. The spool has one end defining a spool breathing hole. The electric actuator has at least one variable volume chamber, which communicates with the discharge port of the sleeve through the axial through hole and the spool breathing hole of the spool. The spool has a communication through hole configured to lead fluid from the output port of the sleeve to the discharge port of the sleeve through the axial through hole of the spool. The electric spool valve further comprises a passage partition member provided in the axial through hole to partition the axial through hole and define an in-spool breathing passage, which communicates with the spool breathing hole.

According to another aspect of the present invention, an electric spool valve configured to be communicated with a releasing portion when being inserted to a stationary member, the electric spool valve comprises a sleeve having an output port. The electric spool valve further comprises a spool having an in-spool axial hole and being axially slidable in the sleeve to control communication between the in-spool axial hole and the output port. The electric spool valve further comprises an electric actuator provided to a rear end of the sleeve to axially exert driving force to the spool, the electric actuator having a variable volume chamber. The sleeve has a front end portion, which is exposed to the releasing portion when being inserted to the stationary member. The front end portion has a center portion and an outer circumferential periphery which respectively have a front end center opening and a front end outer opening being independent from each other. The electric spool valve further comprises a fluid discharging path configured to communicate with the front end center opening through the in-spool axial hole to lead fluid from the output port to the releasing portion. The electric spool valve further comprises an actuator breathing path communicating with the front end outer opening through an outer circumferential periphery of the sleeve and configured to communicate the variable volume chamber with the releasing portion. The actuator breathing path is independent from the fluid discharging path.

According to another aspect of the present invention, an electric spool valve configured to be communicated with a releasing portion when being inserted to a stationary member, the electric spool valve comprises a sleeve having an output port. The electric spool valve further comprises a spool having an in-spool axial hole and being axially slidable in the sleeve to control communication between the in-spool axial hole and the output port. The electric spool valve further comprises an electric actuator provided to a rear end of the sleeve to axially exert driving force to the spool, the electric actuator having a variable volume chamber. The sleeve has a front end portion, which is exposed to the fluid releasing portion when being inserted to the stationary member. The front end portion has a center portion and an outer circumferential periphery which respectively have a front end center opening and a front end outer opening being independent from each other. The electric spool valve further comprises a partition member provided in the in-spool axial hole to partition the in-spool axial hole into a first space, which communicates with the front end outer opening, and a second space, which communicates with the front end center opening. The electric spool valve further comprises a fluid discharging path communicating with the front end outer opening through the first space to lead fluid from the output port to the fluid releasing portion. The electric spool valve further comprises an actuator breathing path communicating with the front end center opening through the second space and configured to communicate the variable volume chamber with the fluid releasing portion. The actuator breathing path is independent from the fluid discharging path.

BRIEF DESCRIPTION OF THE DRAWINGS

The above and other objects, features and advantages of the present invention will become more apparent from the following detailed description made with reference to the accompanying drawings. In the drawings:

FIG. 6A is a sectional view showing an OCV when performing a retard angle operation, FIG. 6B is a sectional view taken along the line VIB-VIB in FIG. 6A and FIG. 6C is a sectional view showing the OCV when performing an advance angle operation, according to a fourth embodiment;

FIG. 7A is a sectional view showing an OCV when performing a retard angle operation, FIG. 7B is a sectional view taken along the line VIIB-VIIB in FIG. 7A, and FIG. 7C is a sectional view showing the OCV when performing an advance angle operation, according to a fifth embodiment;

FIG. 8A is a sectional view showing an OCV, FIG. 8B is a front view showing a sleeve of the OCV when being viewed from a front end of the OCV, and FIG. 8C is a partially sectional view showing an outer breathing groove of the OCV, according to a sixth embodiment;

FIG. 11A is a sectional view showing an OCV when performing a retard angle operation, and FIG. 11B is a sectional view showing the OCV when performing an advance angle operation, according to a seventh embodiment; and FIG. 12A is a sectional view showing an OCV when performing a retard angle operation, and FIG. 12B is a sectional view showing the OCV when performing an advance angle operation, according to an eighth embodiment.

DETAILED DESCRIPTION OF PREFERRED EMBODIMENTS

First Embodiment

A variable valve timing controller (VVT), which is applied to an oil flow control valve (OCV) according to the first embodiment is described with reference to FIGS. 1A to 3. In the present first embodiment, a structure of the VVT is first described with reference to FIG. 2. Next, a basic structure of the OCV, in which a principal part of the present embodiment is not provided, is described with reference to FIG. 3. Thereafter, a feature of the first embodiment is described with reference to FIGS. 1A, 1B, 1C. In the following description, the left side of the sectional view parallel to the axial direction of the OCV is described as the left side, and the right side of the sectional view parallel to the axial direction of the OCV is described as the right side for easy understanding. However, the present definition of the left and right sides are irrelevant to an actual loading direction.

(Structure of VVT)

The VVT is attached to a camshaft of an engine. The camshaft of the engine may be for either of an air intake valve or an exhaust valve. The camshaft may be for both intake-exhaust valves.

The VVT includes a VCT 1, a hydraulic circuit 2, and an ECU 4. The VCT 1 is configured to vary an opening-and-closing timing of a valve continuously. The hydraulic circuit 2 performs a hydraulic pressure control of an operation of the VCT 1. The ECU 4 electrically controls an OCV 3, which is provided in the hydraulic circuit 2.

(Description of VVT 1)

The VCT 1 includes a shoe housing 5 and a vane rotor 6. The shoe housing 5 is rotated synchronizing with the crankshaft of the engine. The vane rotor 6 is rotative integrally with the camshaft relative to the shoe housing 5. A hydraulic actuator is configured in the shoe housing 5 to rotate the vane rotor 6 relative to the shoe housing 5 to manipulate the camshaft to an advance side or a retard side.

Figure 2:
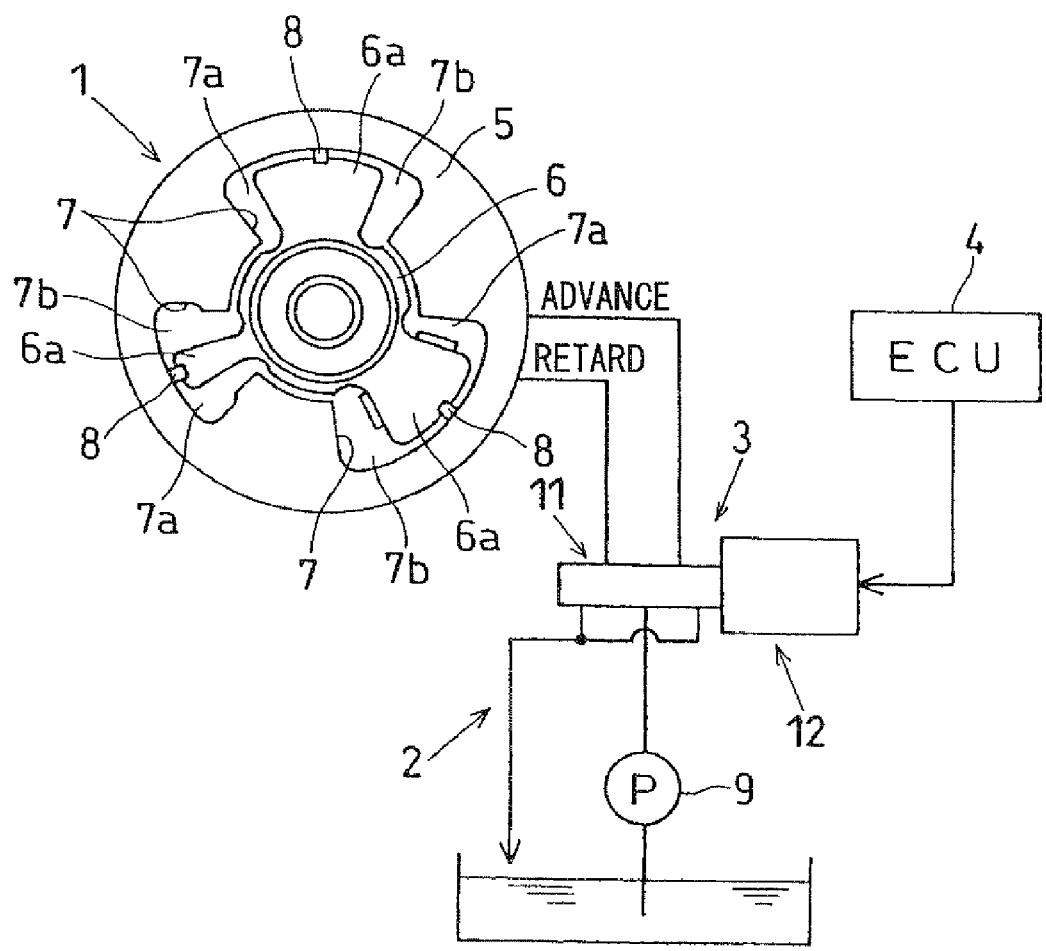
FIG. 2 is a schematic view showing a VVT provided with the OCV.

The shoe housing 5 is joined with a sprocket using a bolt or the like, thereby rotatable integrally with the sprocket. The sprocket is rotated by the crankshaft of the engine via a timing belt a timing chain, or the like. As shown in FIG. 2, the shoe housing 5 has multiple sector-shaped recesses 7 therein. In the present embodiment, the shoe housing 5 has three recesses 7. In FIG. 2, the shoe housing 5 is rotatable with respect to the clockwise direction, and the clockwise rotative direction in FIG. 2 is the advance direction.

The vane rotor 6 is fixed to the end of the camshaft using a bolt or the like, and positioned using a locating pin or the like at the end of the camshaft, thereby rotatable integrally with the camshaft.

The vane rotor 6 includes vanes 6a each partitioning the inside of each recess 7 of the shoe housing 5 into advance chambers 7a and retard chambers 7b. The vane rotor 6 is rotatable within a predetermined angle with respect to the shoe housing 5.

Each of the advance chambers 7a is a hydraulic pressure chamber for actuating the vanes 6a to the advance side by hydraulic pressure. Each of the retard chambers 7b is also a hydraulic pressure chamber for actuating the vanes 6a to the retard side by hydraulic pressure. Each chamber 7a, 7b is liquid tightly sealed from each other by each sealing member 8 and the like:

(Description of Hydraulic Circuit 2)

The hydraulic circuit 2 is configured to feed oil into one of the advance chamber 7a and the retard chamber 7b and discharged oil from the other one of the advance chamber 7a and the retard chamber 7b so as to generate hydraulic pressure difference between the advance chambers 7a and the retard chambers 7b. Thus, the hydraulic circuit 2 is capable of rotating the shoe housing 5 with respect to the vane rotor 6 in accordance with the hydraulic pressure difference. The hydraulic circuit 2 includes an oil pump 9 and the OCV 3. The oil pump 9 is actuated using the crankshaft or the like. The OCV 3 switches supply of oil from the oil pump 9 to one of the advance chamber 7a and the retard chamber 7b, so as to exert hydraulic pressure in the one of the advance chamber 7a and the retard chamber 7b.

(Fundamental Construction of OCV 3)

The OCV 3 is a solenoid spool valve as one example of an electric spool valve. The OCV 3 is constructed by joining a spool valve 11 with an solenoid actuator 12 as one example of an electric actuator.

(Description of Spool Valve 11)

The spool valve 11 includes a sleeve 13, a spool 14, and a return spring 15.

The sleeve 13 is substantially in a cylindrical shape. The sleeve 13 is configured to be inserted from the outside of the engine to the engine, thereby fixed to the engine. The sleeve 13 has an insertion hole 13a, which supports the spool 14 such that the spool 14 is axially slidable in the insertion hole 13a.

The sleeve 13 has a discharge port 13b, an advance chamber output port 13c, an input port 13d, and a retard chamber output port 13e, which are arranged from the left side to the right side. The discharge port 13b is opened to an interior of the engine head. The interior of the engine head is a space, which is surrounded by an engine cylinder head and a cam cover, i.e., an atmospheric pressure space, which is partitioned off from the exterior. The advance chamber output port 13c is communicated with the advance chamber 7a. The input port 13d is supplied with oil from the oil pump 9. The retard chamber output port 13e is communicated with the retard chamber 7b.

The sleeve 13 is provided with only one of the discharge port 13b. The discharge port 13b is provided to the left end as the other end of the sleeve 13. The discharge port 13b is a through hole, which extends in the axial direction and has a relatively large opening area, in which flow resistance of discharged oil is significantly small. The discharge port 13b communicates the exterior of the sleeve 13 with the interior of the sleeve 13. That is, the discharge port 13b communicates the interior of the engine head with the insertion hole 13a.

Each of the input port 1S, the advance chamber output port 13c, and the retard chamber output port 13e is a through hole provided in the side periphery of the sleeve 13 to extend in the radial direction of the sleeve 13. Each of the input port 13d, the advance chamber output port 13c, and the retard chamber output port 13e communicates the exterior (hydraulic passage in the engine) with the interior of the insertion hole 13a at each Hal position.

The spool 14 includes four large diameter portions as lands configured to cut off each port. Each large diameter portion has the outer diameter substantially equal to the inner diameter of the sleeve 13, i.e., the diameter of the insertion hole 13a.

The spool 14 has an axial center defining therein an in-spool axial through hole 14a, which axially extends therethrough. The left end of the in-spool axial through hole 14a with respect to the axial direction has an opening area, which is relatively large. Specifically, the left end of the in-spool axial through hole 14a has an opening area, in which flow resistance of discharged oil is significantly small. The in-spool axial through hole 14a has the right end as one end with respect to the axial direction, and the right end is provided with a spool breathing hole 14b. The spool breathing hole 14b has a relatively small opening area such that flow resistance of discharged oil therein is larger than flow resistance in an intermediate portion of the in-spool axial through hole 14a.

The large diameter portions therebetween define an advance chamber draining small diameter portion (advance-draining small diameter portion) 14c for draining from the advance chambers 7a, an oil discharging small diameter portion 14d for discharging oil, and a retard chamber draining small diameter portion (retard-draining small diameter portion) 14e for draining from the retard chambers 7b. The small diameter portion 14c, the small diameter portion 14d, and the small diameter portion 14e are located at the axial positions of the spool 14 and configured to switch communication among multiple input ports and output ports 13c to 13e.

The advance-draining small diameter portion 14c is configured to drain oil from the advance chambers 7a to reduce hydraulic pressure when oil is supplied to the retard chambers 7b. Discharged oil is led to the advance-drain small diameter portion 14c to flow into the in-spool axial through hole 14a through an advance side spool drain hole (advance-spool drain hole) 14f. The advance-spool drain hole 14f communicates the bottom of the advance-draining small diameter portion 14c with the in-spool axial through hole 14a. The advance-spool drain hole 14f is one of communication through holes and distant from the solenoid actuator 12. The oil is discharged into the engine head through the discharge port 13b.

The oil discharging small diameter portion 14d exerts hydraulic pressure to the advance chamber 7a or the retard chamber 7b.

The retard-raining small diameter portion 14e is configured to drain oil from the retard chambers 7b to reduce hydraulic pressure when oil is supplied to the advance chambers 7a. Discharged oil is led to the retard-drain small diameter portion 14e to flow into the in-spool axial through hole 14a through a retard side spool drain hole (retard-spool drain hole) 149. The retard-spool drain hole 14g communicates the bottom of the retard-draining small diameter portion 14b with the in-spool axial through hole 14a. The retard-spool drain hole 14g is one of communication through holes and in the vicinity of the solenoid actuator 12. The oil is discharged into the engine head through the discharge port 13b.

The return spring 15 is a compression coil spring, which biases the spool 14 to the right side. The return spring 15 is located in a spring chamber 13f on the left side of the sleeve 13. The return spring 15 is axially compressed between the axial end wall surface of the sleeve 13 and the spool 14.

(Description of Solenoid Actuator 12)

The solenoid actuator 12 is constructed of a coil 16, a plunger 17, a stator 18, a yoke 19, and a connector 20. The coil 16 is a magnetic force generating unit configured to generate magnetism when being energized for magnetically attracting the plunger 17. The coil 16 is constructed by winding a lead wire around a circumference of a bobbin 21 for a number of turns. The lead wire is, for example, an enameled wire, which is applied with pre-insulation. The bobbin 21 is made of resin. The plunger 17 is a column-shaped magnetic metallic member, which is magnetically attracted by a magnetically attractive stator 22. The magnetic metallic member is formed of, for example, a ferromagnetic material, which configures a magnetic circuit. The plunger 17 is slidable inside of the stator 18, in particular, inside of a cup guide G for oil seal. The stator 18 is constructed of the magnetically attractive stator 22 and a magnetism delivery stator 23. The magnetically attractive stator 22 magnetically attracts the plunger 17 in the axial direction. The magnetism delivery stator 23 surrounds the outer circumferential periphery of cup guide G to conduct delivery of magnetism with the circumference of the plunger 17.

The magnetically attractive stator 22 is a magnetic metallic member formed of, for example, a ferromagnetic material, which configures a magnetic circuit. The magnetically attractive stator 22 includes a disc portion 22a and a cylindrical portion 22b. The disc portion 22a is inserted between the sleeve 13 and the coil 16. The cylindrical portion 22b draws magnetic flux of the disc portion 22a toward the plunger 17. The plunger 17 and the cylindrical portion 22b therebetween define a main gap with respect to the axial direction. The cylindrical portion 22b and the plunger 17 are capable of axially overlap one another. The cylindrical portion 22b has an end defining a taper such that magnetic attractive force does not change with respect to change in the stroke of the plunger 17. The magnetism delivery stator 23 is a magnetic metallic member, which is formed of, for example a ferromagnetic material to configure a magnetic circuit. The magnetism delivery stator 23 includes a stator cylindrical portion 23a and a stator flange 23b. The stator cylindrical portion 23a is inserted into the inner circumferential periphery of the bobbin 21 to surround the outer circumferential periphery of the plunger 17 via the cup guide G. The stator flange 23b extends from the stator cylindrical portion 23a radially outward. The stator flange 23b is magnetically coupled with the yoke 19, which is located around the outer circumferential periphery of the stator flange 23b. The stator cylindrical portion 23a and the plunger 17 radially define a magnetic flux delivery gap as a side gap therebetween.

The yoke 19 is a magnetic metallic member, which is formed of, for example, a ferromagnetic material to be in a cylindrical shape to configure a magnetic circuit. The yoke 19 surrounds the circumference of the coil 16. The yoke 19 has a claw portion at the left end. The claw portion of the yoke 19 is crimped, thereby the yoke 19 is joined with the sleeve 13. The connector 20 as a joint unit is a part of a secondary resin mold 24, which is embedded with the coil 16 and the like. The connector 20 accommodates ends of the lead wires of the coil 16 and connector terminals 20a. The connector terminals 20a are respectively connected with the ends of the lead wires. The connector terminals 20a are exposed in the connector 20 at one ends. The connector terminals 20a are molded in the secondary resin mold 24 in the state where being inserted in the bobbin 21 at the other ends.

(Description of Shaft 25)

The OCV 3 includes a shaft 25, which is configured to transmit driving force of the plunger 17 exerted to the spool 14 toward the left side. The shaft 25 is also configured to transmit biasing force of the return spring 15, which is provided to the spool 14, to the plunger 17. The shaft 25 is a hollow component, which is formed of a metal plate such as a stainless plate of a nonmagnetic material into a cup shape. The shaft 25 has an inner hollow portion defining an in-shaft breathing passage 25a. The in-shaft breathing passage 25a, which is provided in the shaft 25, communicates with the spool breathing hole 14b, which is located on the right side of the spool 14, through a hole, which is provided on the left end of the shaft 25. In the present structure, the in-shaft breathing passage 25a communicates with the discharge port 13b through the spool breathing hole 14b and the in-spool axial through hole 14a. The shaft 25 has an axial intermediate portion provided with a shaft breathing hole 25b, which communicates the inside of the shaft 25 with the outside of the shaft 25. In the present structure, a first variable volume chamber a between the spool 14 and the plunger 17 on the left side of the plunger 17 communicates with the discharge port 13b through the shaft breathing hole 25b, the in-shaft breathing passage 25a, the spool breathing hole 14b, and the in-spool axial through hole 14a. Thus, the first variable volume chamber a is variable in volume accompanied with movement of the plunger 17. The right end of the shaft 25, which is in the cup shape, has a cup opening. The cup opening communicates with an in-plunger breathing passage 17a, which is provided in the axial center of the plunger 17. In the present structure, a second variable volume chamber β on the right side of the plunger 17 communicates with the discharge port 13b through the in-plunger breathing passage 17a, the in-shaft breathing passage 25a, the spool breathing hole 14b, and the in-spool axial through hole 14a. Thus, the second variable volume chamber β is variable in volume accompanied with movement of the plunger 17.

Figure 3:
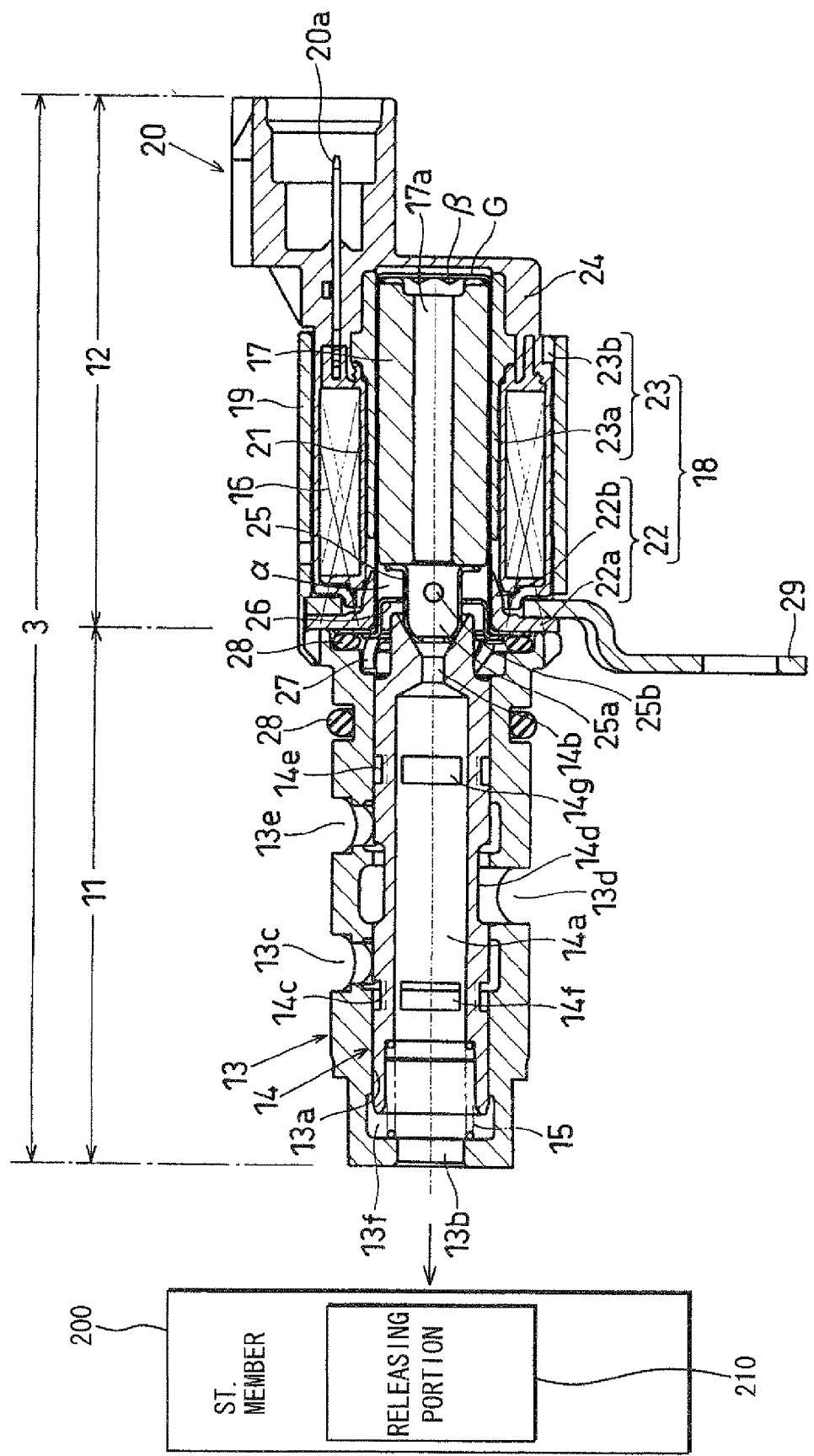
FIG. 3 is a sectional view showing an OCV according to an exemplified embodiment.

Here, a magnetism counter member 26 is inserted on the left side of the cup guide G. The magnetism counter member 26 is a magnetic metallic member and configured to be magnetically coupled with the magnetically attractive stator 22, thereby increasing the attractive force of the plunger 17. The magnetism counter member 26 is fixed using a blade spring 27, which is made of a nonmagnetic metallic member such as a stainless plate. As shown in FIG. 3, an Owing 28 is provided for sealing components from each other. A bracket 29 is provided for fixing the OCV 3 to the engine.

(Description of ECU 4)

The ECU 4 is a generally-known computer. The ECU 4 has a VVT control function for controlling a duty ratio of a current, which is supplied for energization of the coil 16 based on a program stored in a memory. The ECU 4 controls the duty ratio in accordance with an engine operation state such as an operating by an occupant. The engine operation condition is obtained from various sensors and the like. The ECU 4 controls the energization of the coil 16, thereby manipulating the axial direction position of the spool 14. Thus, the ECU 4 controls hydraulic pressure in the advance chambers 7a and the retard chamber 7b, thereby controlling the advanced phase of the camshaft according to the engine operation state.

(Operation of VVT)

When the ECU 4 advances the camshaft according to the operating condition of the vehicle, the ECU 4 increases the amount of the supply current to the coil 16. The magnetism generated by the coil 16 then increases, thereby moving the plunger 17, the shaft 25, and the spool 14 to the left side as the advance side. Communication between the input port 13d and the advance chamber output port 13c then increases, and communication between the retard chamber output port 13e and the discharge port 13b increases. As a result, hydraulic pressure in the advance chambers 7a increases, and conversely, hydraulic pressure in the retard chambers 7b decreases. Thus, the vane rotor 6 is displaced to the advance side relatively to the shoe housing 5, whereby the camshaft is advanced. When the ECU 4 retards the camshaft according to the operating condition of the vehicle, the ECU 4 decreases the amount of the supply current to the coil 16. The magnetism generated by the coil 16 then decreases, thereby moving the plunger 17, the shaft 25, and the spool 14 to the right side as the retard side. Communication between the input port 13d and the retard chamber output port 13e then increases, and communication between the advance chamber output port 13c and the discharge port 13b increases. As a result, hydraulic pressure in the retard chambers 7b increases, and conversely hydraulic pressure in the advance chambers 7a decreases. Thus, the vane rotor 6 is displaced to the retard side relatively to the shoe housing 5, whereby the camshaft is retarded.

Feature of First Embodiment

Back Ground of First Embodiment

In the above structure, the number of the discharge port 13b provided in the sleeve 13 is set to one. The discharge port 13b is opened to the inside of the engine head. In the present structure, the passage structure of the engine, which is provided with the OCV 37 can be simplified. In addition, the in-shaft breathing passage 25a, which is communicated with the first and second variable volume chambers α, β, is further communicated with the in-spool axial through hole 14a through the spool breathing hole 14b, which is provided in the spool 14. In the present structure, the breathing passage in the solenoid actuator 12 can be simplified. Thus, the solenoid actuator 12 can be downsized.

The exemplified structure in FIG. 3 is further described. The exemplified structure shown in FIG. 3 is an exemplified embodiment, and is not a prior art. The OCV 3 in FIG. 3 has only one discharge port 13b in the other end of the sleeve 13 on the opposite side from the solenoid actuator 12. Oil is discharged from the advance chamber and the retard chamber of the VCT 1, and the oil is led into the in-spool axial through hole 14a, which is provided in the spool 14. The spool breathing hole 14b, which communicates with the inside of the solenoid actuator 12, is provided to the one end of the in-spool axial through hole 14a on the side of the solenoid actuator 12. In the present structure, engine oil, which is discharged from the advance chamber and the retard chamber of the VCT 1, may be led into the solenoid actuator 12 through the spool breathing hole 14b. Specifically the spool 14 is provided with two communication through holes including the advance-spool drain hole 14f and the retard-spool drain hole 14g. The advance-spool drain hole 14f and the retard-spool drain hole 14g are configured to draw oil, which is discharged from the advance chamber and the retard chamber, into the in-spool axial through hole 14a. The engine oil discharged into the in-spool axial through hole 14a from, in particular; the retard-spool drain hole 14g, which is in the vicinity of the spool breathing hole 14b, may be led into the solenoid actuator 12 through the spool breathing hole 14b.

The discharge of the engine oil from the advance chamber and the retard chamber of the VCT 1 is mainly accompanied with the operation of the VVT. Accordingly, a large amount of engine oil inflows and outflows with respect to the first and second variable volume chambers $\alpha$, $\beta$ in the solenoid actuator 12 through the spool breathing hole 14b. Consequently, foreign matters contained in the engine oil may possibly intrude into the first and second variable volume chambers $\alpha$, $\beta$. In particular, the first variable volume chamber $\alpha$ is located in the vicinity of the spool breathing hole 14b. Accordingly, the length of the breathing passage, which extends from the spool breathing hole 14b to the first variable volume chamber $\alpha$, is short, and the inner volume of the breathing passage is small. Consequently, the engine oil may be easily led from the inside of the in-spool axial through hole 14a into the first variable volume chamber a through the spool breathing hole 14b, accompanied with change in the volume in the first variable volume chamber $\alpha$. That is, in the sleeve 13, which is provided with the one discharge port 13b, foreign matters contained in oil may easily intrude into the first and second variable volume chambers $\alpha$, $\beta$ in the solenoid actuator 12. In the structure shown in FIG. 3, when the spool breathing hole 14b simply communicates with the in-spool axial through hole 14a, the in-spool axial through hole 14a in the spool 14 is supplied with oil (engine oil) discharged from the advance chamber 7a and the retard chamber 7b. Therefore, the oil discharged into the in-spool axial through hole 14a is led to the first and second variable volume chambers $\alpha$, $\beta$ of the solenoid actuator 12 through the spool breathing hole 14b. That is, in the sleeve 13, which is provided with the one discharge port 13b, foreign matters contained in oil may easily intrude into the first and second variable volume chambers $\alpha$, $\beta$ in the solenoid actuator 12. The first variable volume chamber $\alpha$ is provided between the spool 14 and the plunger 17 to communicate with the sliding clearance between the spool 14 and the plunger 17. The second variable volume chamber $\beta$ is provided between the plunger 17 and a fixing member such as a cup guide G to communicate with the sliding clearance of the plunger 17. In the present structure, when foreign matters intrude into the first and second variable volume chambers $\alpha$, $\beta$, the operation of the spool 14 and the plunger 17 may be disturbed.

Here, as unillustrated, it is conceived that the breathing passage, which extends from the spool breathing hole 14b to the first and second variable volume chambers $\alpha$, $\beta$, may be elongated. Specifically, a first breathing passage, which extends from the spool breathing hole 14b to the first variable volume chamber $\alpha$, and a second breathing passage, which extends from the spool breathing hole 14b to the second variable volume chamber $\beta$, may be elongated so as to enlarge the inner volume of the first and second breathing passages. In this case, the amount of oil, which is newly replaced with respect to the first and second variable volume chambers $\alpha$, $\beta$, can be decreased, and intrusion of foreign matters can be suppressed. However, the solenoid actuator 12 may be increased in size when the inner volume of the first and second breathing passage is increased by simply elongating the first and second breathing passages, which extend from the spool breathing hole 14b respectively to the first and second variable volume chambers $\alpha$, $\beta$. Consequently, downsizing required to the OCV 3 cannot be attained.

(Structure for Solving the Problem 1)

Figure 1A:
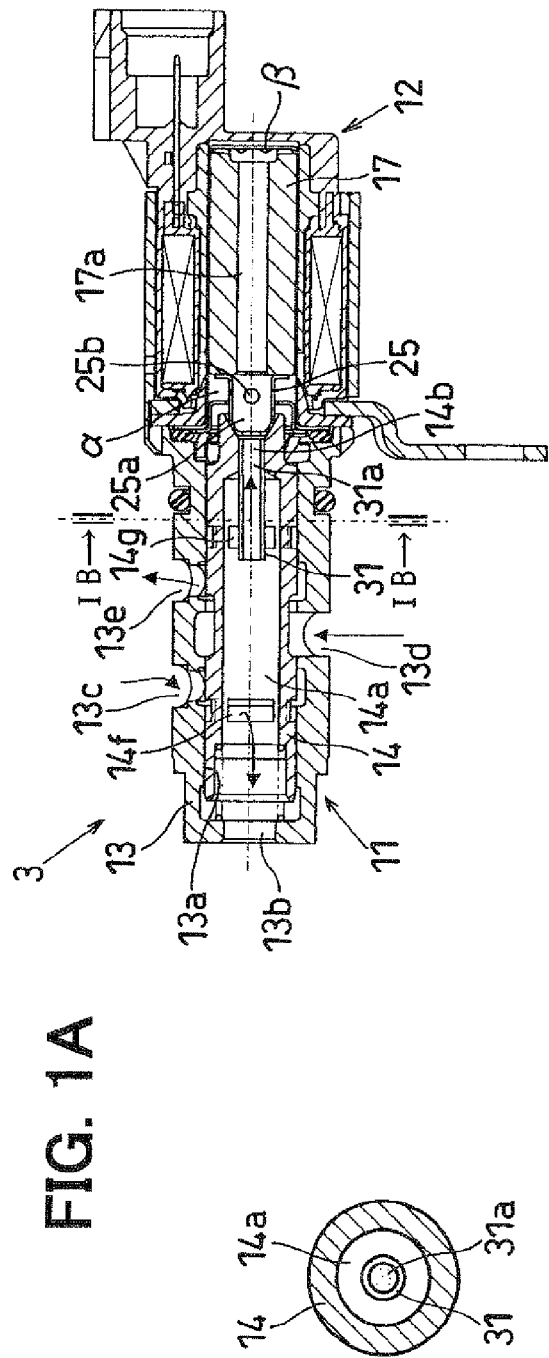
FIG. 1A is a sectional view showing an OCV when performing a retard angle operation.
Figure 1B:
FIG. 1B is a sectional view taken along the line IB-IB in FIG. 1A.
Figure 1C:
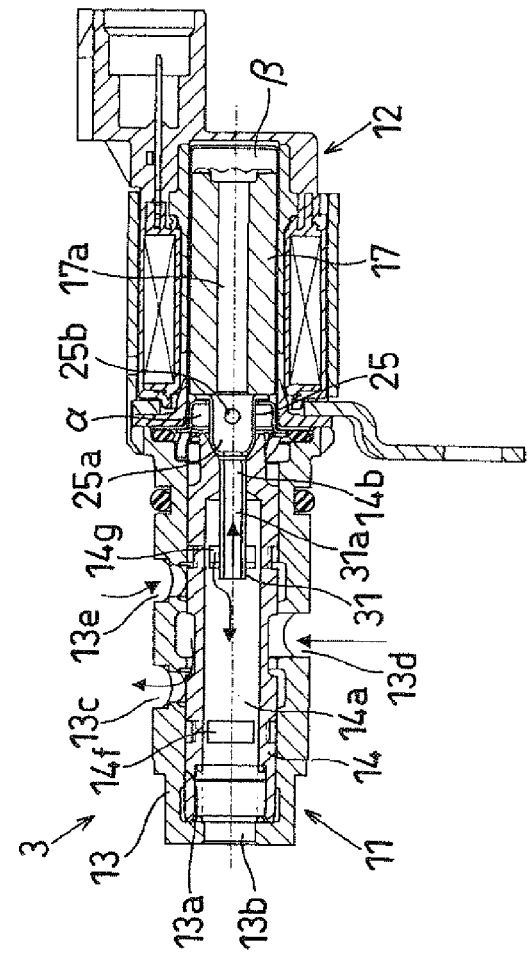
FIG. 1C is a sectional view showing the OCV when performing an advance angle operation, according to a first embodiment.

As shown in FIGS. 1A, 1B, 1C, in the OCV 3 according to the present first embodiment, a passage partition member 31 is provided as the structure for solving the problem. The passage partition member 31 is located inside of the in-spool axial through hole 14a, and an in-spool breathing passage 31a, which is communicated with the spool breathing hole 14b is partitioned and defined inside of the in-spool axial through hole 14a.

According to the present embodiment as shown in FIG. 1B, the passage partition member 31, which is provided in the spool 14, is in a cylindrical shape and communicates with the first and second variable volume chambers $\alpha$, $\beta$ through the in-shaft breathing passage 25a.

The passage partition member 31 is fixed to the spool 14. Specifically according to the present embodiment, the passage partition member 31 is fixed to the inner periphery defining the spool breathing hole 14b by, for example, press-fitting.

The material and the fixing structure of the passage partition member 31 are not limited. When the passage partition member 31 is press-fitted to the inner periphery of the spool breathing hole 14b, the material and the thickness of the passage partition member 31 are determined not to cause breakage by the press-fitting. By way of one example, the passage partition member 31 is formed of aluminum, stainless steel, brass, or the like.

The inner diameter of the passage partition member 31, which defines the in-spool breathing passage 31a, is determined such that breathing can be easily performed. Specifically, when the plunger 17 moves, the difference between changes in the volumes of the first variable volume chamber $\alpha$ and the second variable volume chamber $\beta$ corresponds to the amount of breathing through the in-spool breathing passage 31a. The inner diameter of the passage partition member 31 is determined such that the amount of the breathing is smoothly performed.

In the present structure, the passage partition member 31 is provided inside of the in-spool axial through hole 14a, and the in-spool breathing passage 31a is provided inside of the spool 14. Therefore, the total length of the breathing passage from the inlet port of the in-spool breathing passage 31a to the first and second variable volume chambers $\alpha$, $\beta$ becomes large. In addition, the total volume of the breathing passage also becomes large. In the present structure, the length and the volume of the in-spool breathing passage 31a can be secured by providing the in-spool breathing passage 31a, at least. In the present structure, even when oil moves through the spool breathing hole 14b accompanied with the change in the volumes of the first and second variable volume chambers $\alpha$, $\beta$, an amount of oil, which is newly replaced within the oil drawn to the first and second variable volume chambers $\alpha$, $\beta$, can be suppressed. Thus, intrusion of foreign matters into the first and second variable volume chambers α, β can be suppressed.

In the present structure, in the OCV 3 according to the present first embodiment, the number of the discharge port 13b provided in the sleeve 13 is set to one. Here, in particular, by providing the passage partition member 31 and the in-spool breathing passage 31a in the spool 14, suction of foreign matters into the first and second variable volume chambers α, β can be restricted without increasing the solenoid actuator 12 in size.

Back Ground of First Embodiment 2

Oil is discharged from the advance chamber 7a, and the discharged oil flows into the in-spool axial through hole 14a through the advance-spool drain hole 14f. As shown in FIG. 1A, the discharged oil flows toward the discharge port 13b in the vicinity of the advance-spool drain hole 14f. In the present structure, the discharged oil, which flows from the advance-spool drain hole 14f into the in-spool axial through hole 14a, is hard to enter the inside of the in-spool breathing passage 31a.

On the other hand, discharged oil, which flows from the retard-spool drain hole 14g into the in-spool axial through hole 14a, is distant from the discharge port 13b. Therefore, the discharged oil may intrude into the in-spool breathing passage 31a due to flow resistance in the in-spool axial through hole 14a or the like. When the discharged oil, which flows into the in-spool axial through hole 14a, intrudes into the in-spool breathing passage 31a accompanied with a flow operation (inertia) of the discharged oil, oil inside of the in-spool breathing passage 31a may be replaced with the discharged oil. In the present condition, oil newly intrudes into the in-spool breathing passage 31a by breathing of the first and second variable volume chambers α, β. The newly intruding oil may be led to the first and second variable volume chambers α, β, and consequently, intrusion of foreign matters may arise.

(Structure for Solving the Problem 2)

Therefore, according to the present first embodiment, the left end of the passage partition member 31 of the passage partition member 31 is located on the side of the discharge port 13b from the position of the retard-spool drain hole 14g with respect to the axial direction. That is, the position, at which the partition of the in-spool breathing passage 31a defined by the passage partition member 31 ends, i.e., lost is set at on the left side from the position of the retard-spool drain hole 14g. In the present structure, the inlet of the in-spool breathing passage 31a is directed to the left side. Thus, discharged oil, which flows into the in-spool axial through hole 14a through the retard-spool drain hole 14g, can be inhibited from flowing into the in-spool breathing passage 31a.

Oil is discharged from the retard chamber 7b, and the discharged oil flows into the in-spool axial through hole 14a through the retard-spool drain hole 14g. As shown in FIG. 1C, the discharged oil flows toward the discharge port 13b. In the present structure, the discharged oil, which flows from the retard-spool drain hole 14g into the in-spool axial through hole 14a, flows to the left side through the in-spool axial through hole 14a.

On the other hand, the flow direction of oil, which is drawn into the solenoid actuator 12 accompanied with the operation of the solenoid actuator 12, is on the right side opposite from the discharge port 13b. That is, the flow direction of the oil, which is drawn into the solenoid actuator 12 accompanied with the operation, is opposite to the flow direction of the discharged oil, which flows into the in-spool axial through hole 14a through the retard-spool drain hole 14g and moves toward the discharge port 13b.

The discharged oil, which flows from the retard-spool drain hole 14g into the in-spool axial through hole 14a toward the discharge port 13b, has inertia. Therefore, the discharged oil can be restricted from intruding into the in-spool breathing passage 31a by the flow operation of the discharged oil. Therefore, the discharged oil can be restricted from intruding into the in-spool breathing passage 31a by the flow operation of the discharged oil, and consequently, defects caused by intrusion of foreign matters into the solenoid actuator 12 can be reduced.

Second Embodiment

Figure 4A:
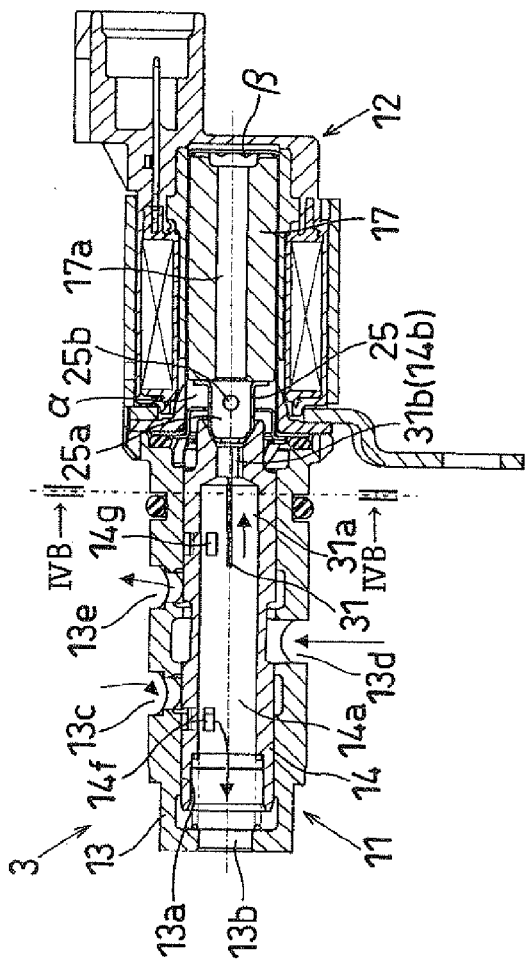
FIG. 4A is a sectional view showing an OCV when performing a retard angle operation.
Figure 4B:
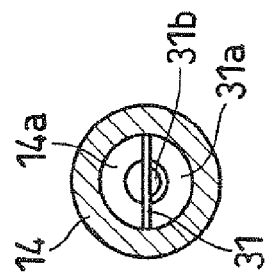
FIG. 4B is a sectional view taken along the line IVB-IVB in FIG. 4A
Figure 4C:
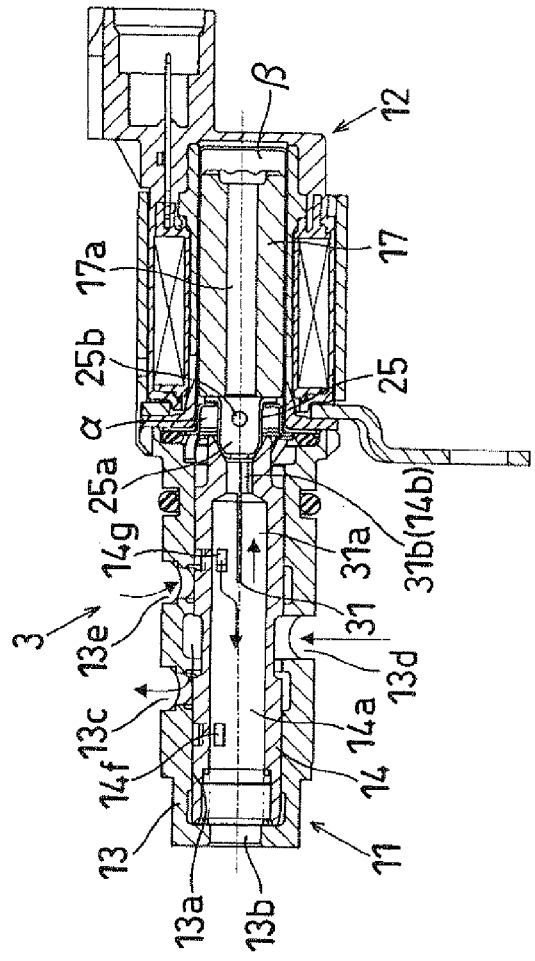
FIG. 4C is a sectional view showing the OCV when performing an advance angle operation, according to a second embodiment.

The second embodiment is described with reference to FIGS. 4A, 4B, 4C. According to the first embodiment, the passage partition member 31 is in a cylindrical shape. On the other hand, according to the present embodiment, as shown in FIG. 4B, the passage partition member 31 is in a plate-shape to partition off the inside of the in-spool axial through hole 14a with respect to the circumferential direction, when being viewed from the axial direction. The passage partition member 31 according to the present second embodiment is fixed to the inner periphery defining the spool breathing hole 14b by press-fitting or the like, similarly to the first embodiment. The passage partition member 31, which is joined with the spool breathing hole 14b, has a portion provided with a communication hole 31b. The communication hole 31b communicates the in-spool breathing passage 31a with the in-shaft breathing passage 25a. The present second embodiment is also capable of producing an operation effect similar to that of the first embodiment.

Third Embodiment

Figure 5A:
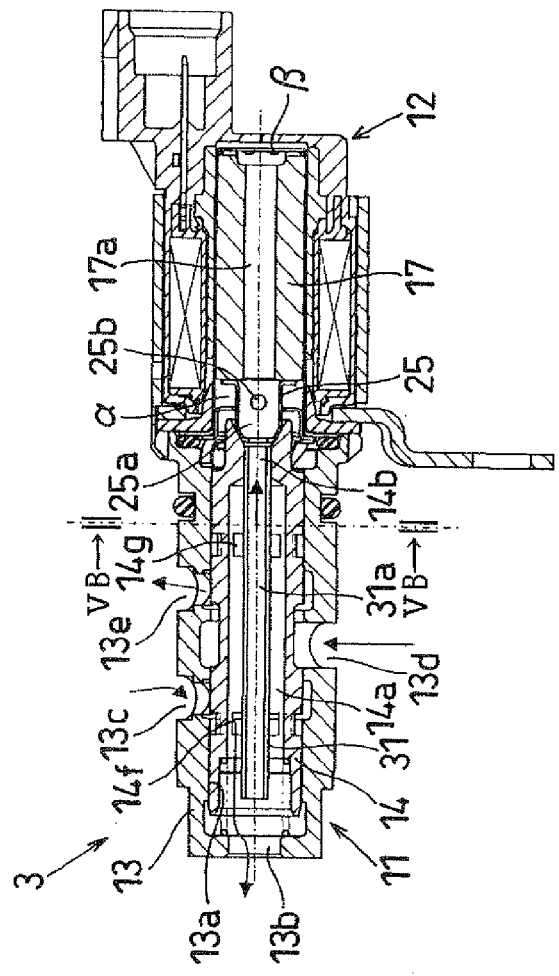
FIG. 5A is a sectional view showing an OCV when performing a retard angle operation.
Figure 5B:
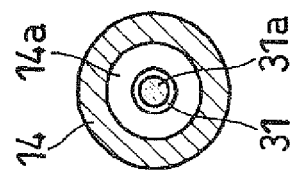
FIG. 5B is a sectional view taken along the line VB-VB in FIG. 5A
Figure 5C:
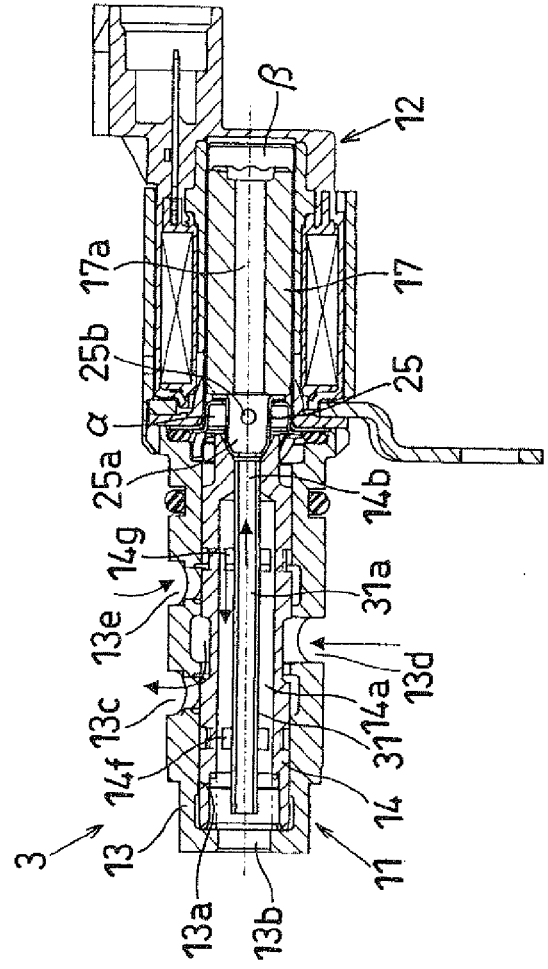
FIG. 5C is a sectional view showing the OCV when performing an advance angle operation, according to a third embodiment.

The third embodiment is described with reference to FIGS. 5A, 5B, 5C. According to the present third embodiment the passage partition member 31, which is in a cylindrical shape, is employed, similarly to the first embodiment. According to the present third embodiment, the passage partition member 31 is extended in the axial direction, as compared with the first embodiment. Specifically, the volume of the in-spool breathing passage 31a, which is partitioned off by the passage partition member 31, is greater than the difference between the changes in the volumes of the first variable volume chamber α and the second variable volume chamber β. That is, the volume of the in-spool breathing passage 31a is greater than the amount of oil, which passes through the inside of the spool breathing hole 14b accompanied with the breathing operation.

In the present structure, oil, which flows into and out of the first and second variable volume chambers α, β accompanied with the changes in the volumes, is substantially regularly held in the in-spool breathing passage 31a. Therefore, newly replaced oil within the amount of oil, which is drawn to the first and second variable volume chambers α, β, can be significantly reduced. That is, the amount of oil, which is drawn through the inlet of the in-spool breathing passage 31a into the first and second variable volume chambers α, β, can be reduced. In the present structure, even when the volumes in the first and second variable volume chambers α, β change accompanied with the operation of the solenoid actuator 12, foreign matters can be restricting from further intruding into the first and second variable volume chambers α, β.

Further, according to the present third embodiment, the passage partition member 31 is extended in the axial direction. The left end of the passage partition member 31, which defines the inlet of the in-spool breathing passage 31a, is located on the left side of the advance-spool drain hole 14f with respect to the axial direction. That is, the position, at which the partition of the in-spool breathing passage 31a defined by the passage partition member 31 ends, is located on the side of the discharge port 13b from the advance-spool drain hole 14f. The inlet of the in-spool breathing passage 31a is directed to the left side.

Specifically, the inlet of the in-spool breathing passage 31a opens in the vicinity of the discharge port 13b. The discharged oil, which flows from the advance-spool drain hole 14f into the in-spool axial through hole 14a toward the discharge port 13b, has inertia. Therefore, the discharged oil can be restricted from intruding into the in-spool breathing passage 31a by the flow operation of the discharged oil. Thus, defects, which are caused by intrusion of foreign matters contained in the discharged oil into solenoid actuator 12, can be steadily inhibited by the flow operation of the discharged oil.

Fourth Embodiment

The fourth embodiment is described with reference to FIGS. 6A, 6B, 6C. According to the present fourth embodiment, the passage partition member 31, which is in a plate shape, is employed, similarly to the second embodiment. According to the present fourth embodiment, the passage partition member 31 is extended in the axial direction, similarly to the third embodiment as compared with the second embodiment. Specifically the volume of the in-spool breathing passage 31a, which is partitioned off by the passage partition member 315 is greater than the difference between the changes in the volumes of the first variable volume chamber α and the second variable volume chamber β. That is, the volume of the in-spool breathing passage 31a is greater than the amount of oil, which passes through the spool breathing hole 14b accompanied with the breathing operation. The present fourth embodiment is also capable of producing an operation effect similar to that of the third embodiment.

Fifth Embodiment

The fifth embodiment is described with reference to FIGS. 7A, 78, 7C. In the first to fourth embodiments, the passage partition member 31 is fixed to the spool 14. On the contrary, according to the present fifth embodiment, the passage partition member 31 is fixed to the shaft 25.

Specifically, according to the present fifth embodiment, the passage partition member 31, which is in a cylindrical shape extended in the axial direction, is employed, similarly to the third embodiment. In the present third embodiment in addition, the passage partition member 31 is fixed to the shaft 25. The passage partition member 31 and the shaft 25 may by provided as separated components and may be connect with each other by soldering, welding, press-fitting, or the like. Alternatively, the passage partition member 31 and the shaft 25 may be provided as a single component integrated by press forming or the like. Further, according to the present third embodiment, since the spool 14 and the shaft 25 are configured to annularly make contact with each other, direct communication between the inside of the in-spool axial through hole 14a and the first variable volume chamber α is restricted. The present fifth embodiment is also capable of producing an operation effect similar to that of the third embodiment. When the passage partition member 31 and the shaft 25 are integrated by press processing or the like, the number of the components can be reduced, and manufacturing cost can be also reduced.

Sixth Embodiment

A variable valve timing controller (VVT), which is applied to an oil flow control valve (OCV) according to the sixth embodiment is described with reference to FIGS. 8A to 12B. In the present sixth embodiment, a structure of the VVT is first described with reference to FIG. 9. Next, a basic structure of the OCV, in which a principal part of the present embodiment is not provided, is described with reference to FIG. 10. Thereafter, a feature of the present embodiment is described with reference to FIGS. 5A, 8B.

(Structure of VVT)

The VVT includes the VCT 1, the hydraulic circuit 2, and the ECU 4. The VCT 1 is provided to a camshaft of the engine for manipulating intake valves, exhaust valves, or both the intake valves and the exhaust valves. The VCT 1 is configured to vary the opening-and-closing timing of the valve continuously. The hydraulic circuit 2 performs a hydraulic pressure control of an operation of the VCT 1. The ECU 4 electrically controls the OCV 3, which is provided in the hydraulic circuit 2.

(Description of VVT 1)

The VCT 1 includes the shoe housing 5 and the vane rotor 6. The shoe housing 5 is rotated synchronizing with the crankshaft of the engine. The vane rotor 6 is rotative integrally with the camshaft relative to the shoe housing 5. The hydraulic actuator is configured in the shoe housing 5 to rotate the vane rotor 6 relative to the shoe housing 5 to manipulate the camshaft to the advance side or the retard side.

Figure 9:
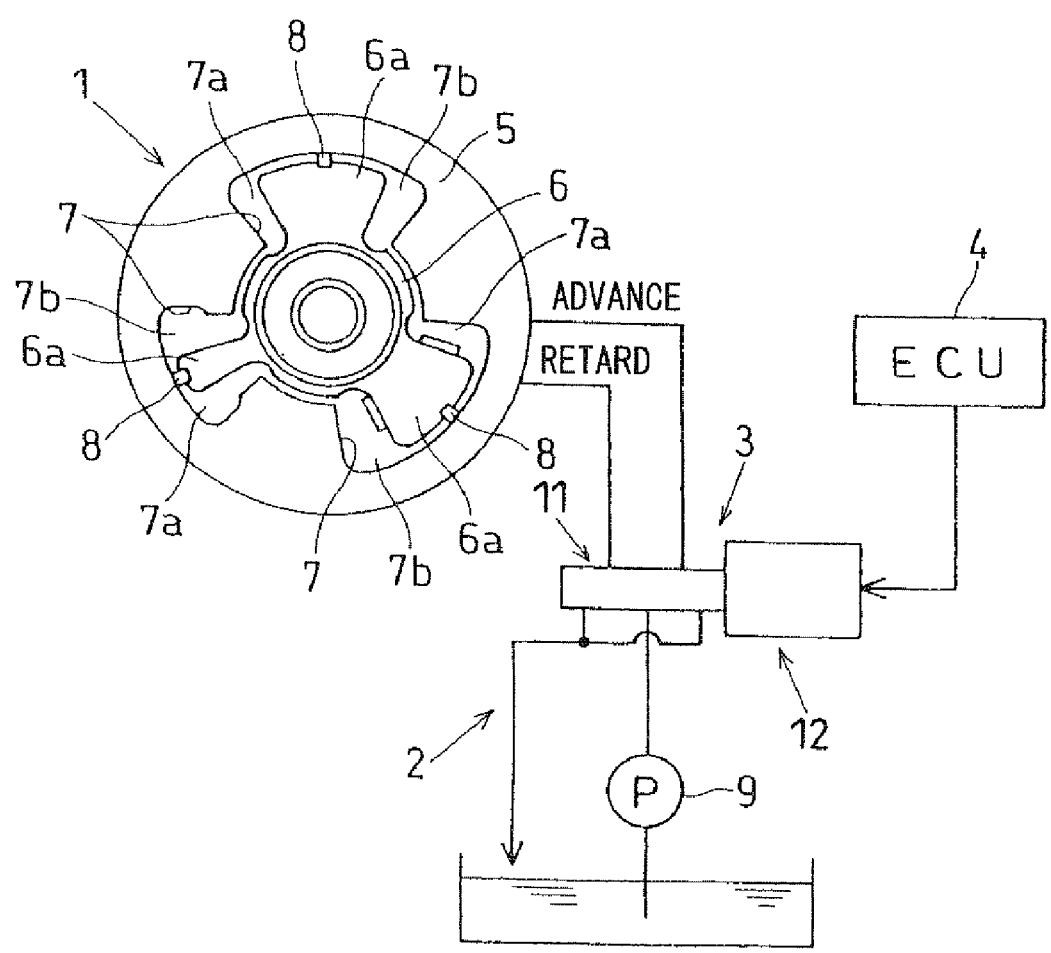
FIG. 9 is a schematic view showing a VVT provided with the OCV.

The shoe housing 5 is joined with the sprocket using a bolt or the like, thereby rotatable integrally with the sprocket. The sprocket is rotated by the crankshaft of the engine via a timing belt a timing chain, or the like. As shown in FIG. 9, the shoe housing 5 has the multiple sector-shaped recesses 7 therein. In the present sixth embodiment, the shoe housing 5 has three recesses 7. In FIG. 9, the shoe housing 5 is rotatable with respect to the clockwise direction, and the clockwise rotative direction in FIG. 9 is the advance direction.

The vane rotor 6 is fixed to the end of the camshaft using a bolt or the like, and positioned using a locating pin or the like at the end of the camshaft, thereby rotatable integrally with the camshaft.

The vane rotor 6 includes the vanes 6a each partitioning the inside of each recess 7 of the shoe housing 5 into the advance chambers 7a and the retard chambers 7b. The vane rotor 6 is rotatable within a predetermined angle with-respect-to the shoe housing 5.

The advance chamber 7a is a hydraulic pressure chamber for actuating the vanes 6a to the advance side by hydraulic pressure. The retard chamber 7b is also a hydraulic pressure chamber for actuating the vanes 6a to the retard side by hydraulic pressure. Each chamber 7a, 7b is liquid tightly sealed from each other by sealing members 8 and the like.

(Description of Hydraulic Circuit 2)

The hydraulic circuit 2 is configured to feed oil into one of the advance chamber 7a and the retard chamber 7b and discharge oil from the other one of the advance chamber 7a and the retard chamber 7b so as to generate hydraulic pressure difference between the advance chambers 7a and the retard chambers 7b. Thus, the hydraulic circuit 2 is capable of rotating the shoe housing 5 with respect to the vane rotor 6 in accordance with the hydraulic pressure difference. The hydraulic circuit 2 includes the oil pump 9 and the OCV 3.

The oil pump 9 is actuated using the crankshaft or the like. The OCV 3 switches supply of oil from the oil pump 9 to one of the advance chamber 7a and the retard chamber 7b, so as to exert hydraulic pressure in the one of the advance chamber 7a and the retard chamber 7b.

(Exemplified Construction of OCV 3)

The OCV 3 is a solenoid spool valve as one example of an electric spool valve. The OCV 3 is constructed by joining the spool valve 11 with the solenoid actuator 12 as one example of an electric actuator.

In the following description, the left side of the OCV when being mounted is described as the left side, and the right side of the OCV when being mounted is described as the right side for assistance of the description of the OCV 3. However, the present definition of the left and right sides are irrelevant to an actual loading direction.

(Description of Spool Valve 11)

The spool valve 11 includes the sleeve 13, the spool 14, and the return spring 15.

The sleeve 13 is substantially in a cylindrical shape. The sleeve 13 has the insertion hole 138, which supports the spool 14 such that the spool 14 is axially slidable. The sleeve 13 is inserted from the exterior of the engine and fixed to the engine. Specifically, the sleeve 13 is inserted from the front end side into an attachment hole, which is in the shape of a cylindrical bore and provided in the engine cylinder head. Thus, the sleeve 13 is fixed to the attachment hole.

The sleeve 13 has a front end portion exposed to an oil releasing portion 210 (FIG. 3) in a state where being attached to the engine. The oil releasing portion 210 is a space, which is an interior of the engine head, for example. The oil releasing portion 210 is surrounded by an engine cylinder head and a cam cover. The oil releasing portion 210 is an atmospheric pressure space, which is partitioned off from the exterior.

The sleeve 13 has a front end center opening (discharge port) 13b, the advance chamber output port 13c, the input port 13d, and the retard chamber output port 13e, which are arranged from the front end side to the rear end side. The front end center opening 13b is opened to the interior of the engine head. The advance chamber output port 13c is communicated with the advance chamber 7a. The input port 13d is supplied with oil from the oil pump 9. The retard chamber output port 13e is communicated with the retard chamber 7b.

The front end center opening 13b is provided to the front end of the sleeve 13. The front end center opening 13b is a through hole, which extends in the axial direction and has a relatively large opening area, in which flow resistance of discharged oil is significantly small. The front end center opening 13b communicates the exterior of the sleeve 13 with the interior of the sleeve 13. That is, the front end center opening 13b communicates the interior of the engine head with the insertion hole 13a.

Each of the input port 13d, the advance chamber output port 13c, and the retard chamber output port 13e is a through hole provided in the side periphery of the sleeve 13 to extend in the radial direction of the sleeve 13. Each of the input port 13d, the advance chamber output port 13c, and the retard chamber output port 13e communicates the exterior (hydraulic passage in the engine) with the interior of the insertion hole 13a at each axial position.

The spool 14 includes four large diameter portions as lands configured to cut off each port. Each large diameter portion has the outer diameter substantially equal to the inner diameter of the sleeve 13, i.e., the diameter of the insertion hole 13a.

The axial center of the spool 14 has the spool breathing hole 14b extended in the axial direction to the front end center opening 13b. The in-spool axial through hole 14a is an axial hole having a relatively large opening area, which is configured to cause small flow resistance of discharged oil. The in-spool axial through hole 14a is formed by machining work or the like to extend from the front end of the spool 14 to the vicinity of the rear end of the spool 14. The tip end side of the in-spool axial through hole 148 communicates with the front end center opening 13b.

The in-spool axial through hole 148 has the spool breathing hole 14b having a relatively small opening area. Specifically, the spool breathing hole 14b is configured to cause flow resistance of discharged oil greater than flow resistance in an intermediate portion of the in-spool axial through hole 14a. The in-spool axial through hole 14a communicates with the interior on the side of the solenoid actuator 12 through the spool breathing hole 14b.

The large diameter portions therebetween define the small diameter portion 14c for draining from the advance chambers 7a, the small diameter portion 14d for discharging oil, and the small diameter portion 14e for draining from the retard chambers 7b. The small diameter portion 14c, the small diameter portion 14d, and the small diameter portion 14e are located at the axial positions of the spool 14 and configured to switch communication among multiple input and output ports 13c to 13e. The advance-draining small diameter portion 14c is configured to drain oil from the advance chambers 7a to reduce hydraulic pressure when oil is supplied to the retard chamber 7b. Discharged oil is led to the advance-drain small diameter portion 14c to flow into the in-spool axial through hole 14a through the advance-spool drain hole 14f as the communication hole. The advance-spool drain hole 14f communicates the bottom of the advance-draining small diameter portion 14c with the in-spool axial through hole 14a. The oil is discharged into the engine head through the front end center opening 13b.

The oil discharging small diameter portion 14d regularly communicates with the input port 13d to supply oil, which flows from the input port 13d, to the advance chambers 7a or the retard chambers 7b. The retard-draining small diameter portion 14e is configured to drain oil from the retard chambers 7b to reduce hydraulic pressure when oil is supplied to the advance chamber 7a. Discharged oil is led to the retard-drain small diameter portion 14e to flow into the in-spool axial through hole 14a through the retard-spool drain hole 14g as the communication hole. The retard-spool drain hole 14g communicates the bottom of the retard-draining small diameter portion 14e with the in-spool axial through hole 14a. The oil is discharged into the engine head through the front end center opening 13b.

The return spring 15 is a compression coil spring, which biases the spool 14 to the rear side. The return spring 15 is located in the spring chamber 13f on the front side of the sleeve 13. The return spring 15 is axially compressed between the axial end wall surface of the sleeve 13 and the spool 14.

(Description of Solenoid Actuator 12)

The solenoid actuator 12 is constructed of the coil 16, the plunger 17, the stator 18, the yoke 19, and the connector 20.

The coil 16 is the magnetic force generating unit configured to generate magnetism when being energized for magnetically attracting the plunger 17. The coil 16 is constructed by winding a lead wire around the circumference of the bobbin 21 for a number of turns. The lead wire is, for example, an enameled wire, which is applied with pre-insulation. The bobbin 21 is made of resin.

The plunger 17 is a column-shaped magnetic metallic member, which is magnetically attracted by the magnetically attractive stator 22. The magnetic metallic member is formed of, for example, a ferromagnetic material, which configures a magnetic circuit. The plunger 17 is slidable inside of the stator 18, in particular; inside of a cup guide G for oil seal.

The stator 18 is constructed of the magnetically attractive stator 22 and the magnetism delivery stator 23. The magnetically attractive stator 22 magnetically attracts the plunger 17 in the axial direction. The magnetism delivery stator 23 surrounds the outer circumferential periphery of cup guide G to conduct delivery of magnetism with the circumference of the plunger 17.

The magnetically attractive stator 22 is a magnetic metallic member formed of, for example, a ferromagnetic material, which configures a magnetic circuit. The magnetically attractive stator 22 includes the disc portion 22a and the cylindrical portion 22b. The disc portion 22a is inserted between the sleeve 13 and the coil 16. The cylindrical portion 22b draws magnetic flux of the disc portion 22a toward the plunger 17. The plunger 17 and the cylindrical portion 22b therebetween define the main gap with respect to the axial direction.

The cylindrical portion 22b and the plunger 17 are capable of axially overlap one another. The cylindrical portion 22b has the end defining a taper such that magnetic attractive force does not change with respect to change in the stroke of the plunger 17.

The magnetism delivery stator 23 is a magnetic metallic member which is formed of, for example a ferromagnetic material to configure a magnetic circuit. The magnetism delivery stator 23 includes the stator cylindrical portion 23a and the stator flange 23b. The stator cylindrical portion 23a is inserted into the inner circumferential periphery of the bobbin 21 to surround the outer circumferential periphery of the plunger 17 via the cup guide G. The stator flange 23b extends from the stator cylindrical portion 23a radially outward. The stator flange 23b is magnetically coupled with the yoke 19, which is located around the outer circumferential periphery of the stator flange 23b. The stator cylindrical portion 23a and the plunger 17 radially define the magnetic flux delivery gap as the side gap therebetween.

The yoke 19 is a magnetic metallic member, which is formed of, for example, a ferromagnetic material to be in a cylindrical shape to configure a magnetic circuit. The yoke 19 surrounds the circumference of the coil 16. The yoke 19 has a claw portion at the front end. The claw portion of the yoke 19 is crimped, thereby the yoke 19 is joined with the sleeve 13. The connector 20 as the joint unit is a part of the secondary resin mold 24, which is embedded with the coil 16 and the like. The connector 20 accommodates ends of the lead wires of the coil 16 and the connector terminals 20a. The connector terminals 20a are respectively connected with the ends of the lead wires. The connector terminals 20a are exposed in the connector 20 at one ends. The connector terminals 20a are molded in the secondary resin mold 24 in the state where being inserted in the bobbin 21 at the other ends.

(Description of Shaft 25)

The OCV 3 includes the shaft 25, which is configured to transmit driving force of the plunger 17 exerted to the spool 14 toward the front side. The shaft 25 is also configured to transmit biasing force of the return spring 15, which is provided to the spool 14, to the plunger 17. The shaft 25 is a hollow component, which is formed of a metal plate such as a stainless plate of a nonmagnetic material into a cup shape. The shaft 25 has an inner hollow portion defining an in-shaft space (in-shaft breathing passage) 25a.

The in-shaft space 25a communicates with the spool breathing hole 14b through a hole, which is provided in the front end of the shaft 25. The shaft 25 has an axial intermediate portion provided with the shaft breathing hole 25b, which communicates the inside of the shaft 25 with the outside of the shaft 25. In the present structure, the first variable volume chamber a between the spool 14 and the plunger 17 on the front side of the plunger 17 communicates with the front end center opening 13b through the shaft breathing hole 25b, the in-shaft breathing passage 25a, the spool breathing hole 14b, and the in-spool axial through hole 14a. Thus, the first variable volume chamber α is variable in volume accompanied with movement of the plunger 17.

The rear end of the shaft 25, which is in the cup shape, has the cup opening. The cup opening communicates with the in-plunger breathing passage 17a, which is a through hole provided in the axial center of the plunger 17. In the present structure, the second variable volume chamber β on the rear side of the plunger 17 communicates with the front end center opening 13b through the in-plunger breathing passage 17a, the in-shaft breathing passage 25a, the spool breathing hole 14b, and the in-spool axial. Through hole 14a. Thus, the second variable volume chamber β is variable in volume accompanied with movement of the plunger 17.

Figure 10:
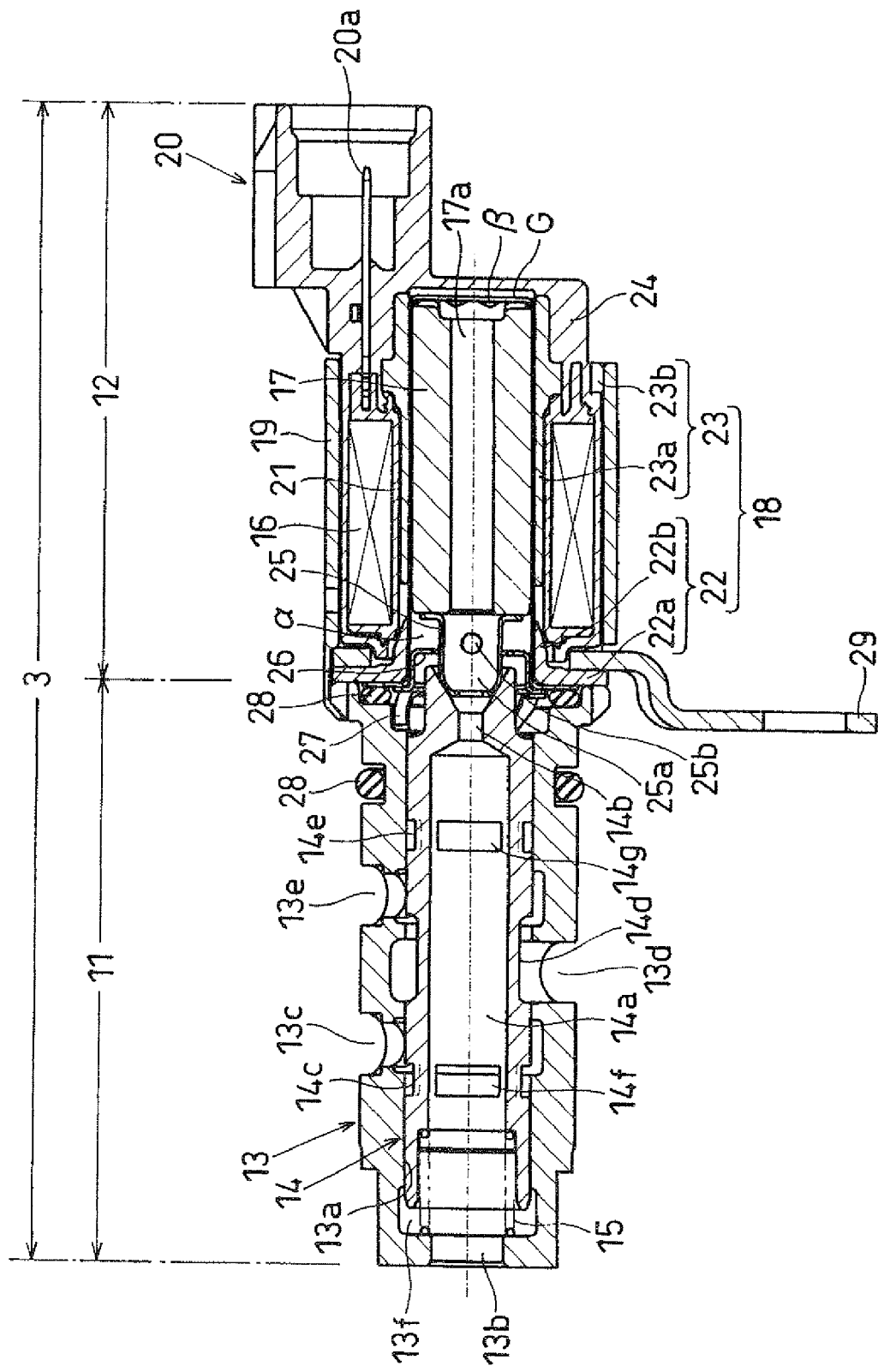
FIG. 10 is a sectional view showing an OCV according to an exemplified embodiment.

Here, the magnetism counter member 26 is inserted on the Font side of the cup guide G. The magnetism counter member 26 is a magnetic metallic member and configured to be magnetically coupled with the magnetically attractive stator 22, thereby increasing the attractive force of the plunger 17. The magnetism counter member 26 is fixed using the blade spring 27, which is made of a nonmagnetic metallic member such as a stainless plate. The magnetism counter member 26 and The blade spring 27 may be omitted. As shown in FIG. 10, the O-ring 28 is provided for sealing components from each other. The bracket 29 is provided for fixing the OCV 3 to the engine.

(Description of ECU 4)

The ECU 4 is a generally-known computer. The ECU 4 has the VVT control function for controlling a duty ratio of a current, which is supplied for energization of the coil 16 based on a program stored in a memory. The ECU 4 controls the duty ratio in accordance with an engine operation state such as an operating by an occupant. The engine operation condition is obtained from various sensors and the like. The ECU 4 controls the energization of the coil 16, thereby manipulating the axial direction position of the spool 14. Thus, the ECU 4 controls hydraulic pressure in the advance chambers 7a and the retard chamber 7b, thereby controlling the advanced phase of the camshaft according to the engine operation state.

(Operation of VVT)

When the ECU 4 advances the camshaft according to the operating condition of the vehicle, the ECU 4 increases the amount of the supply current to the coil 16. The magnetism generated by the coil 16 then increases, thereby moving the plunger 17, the shaft 25, and the spool 14 to the front side as the advanced side. Communication between the input port 13d and the advance chamber output port 13c then increases, and communication between the retard chamber output port 13e and the front end center opening 13b increases. As a result, hydraulic pressure in the advance chambers 7a increases, and conversely hydraulic pressure in the retard chambers 7b decreases. Thus, the vane rotor 6 is displaced to the advanced side relatively to the shoe housing 5, whereby the camshaft is advanced.

When the ECU 4 retards the camshaft according to the operating condition of the vehicle, the ECU 4 decreases the amount of the supply current to the coil 16. The magnetism generated by the coil 16 then decreases, thereby moving the plunger 17, the shaft 25, and the spool 14 to the rear side as the retard side. Communication between the input port 13d and the retard chamber output port 13e then increases, and communication between the advance chamber output port 13c and the front end center opening 13b increases. As a result hydraulic pressure in the retard chambers 7b increases, and conversely hydraulic pressure in the advance chambers 7a decreases. Thus, the vane rotor 6 is displaced to the retard side relatively to the shoe housing 5, whereby the camshaft is retarded.

Feature of Sixth Embodiment

Back Ground of Sixth Embodiment 1

As described above, in the present structure, the front end of the spool valve 11 is exposed to the oil releasing portion 210. The front end center opening 13b is provided in the front end of the sleeve 13. Oil flowing from the advance chamber output port 13c and the retard chamber output port 13e is discharged into an oil discharging path to pass through the in-spool axial through hole 14a and the front end center opening 13b. Thus, in the present structure, the structure of the engine passage can be simplified. In the present structure, the first and second variable volume chambers α, β are communicated with each other through the actuator breathing path, which passes through the in-shaft space 25a, the in-spool axial through hole 14a, and the front end center opening 13b. Thus, the actuator breathing path in the solenoid actuator 12 can be simplified.

Here, in the structure shown in FIG. 10, the actuator breathing path and the oil discharging path commonly share the in-spool axial through hole 14a as a common passage. In the structure shown in FIG. 10, oil (engine oil) discharged from the advance chambers 7a and the retard chambers 7b is led to the first and second variable volume chambers α, β through the in-spool axial through hole 14a, the spool breathing hole 14b, and the in-shaft space 25a. In the present structure of FIG. 10, foreign matters contained in the engine oil discharged from the VCT 1 is led to the first and second variable volume chambers α, β, and consequently the foreign matters may reach a slidable surface of the plunger 17.

OCV 3 of Sixth Embodiment

The OCV 3 according to the present sixth embodiment employs the following structure in order to avoid the above defect in FIG. 10.

(a-1) The front end of the sleeve 13, which is exposed to the inside of the engine head, is provided with the front end center opening 13b and a front end outer opening 131. The front end center opening 13b and the front end outer opening 131 are separately provided to the center portion of the sleeve 13 and the outer circumferential periphery of the sleeve 13.

(b-1) Oil is discharged from the advance chamber output port 13c and the retard chamber output port 13e into the engine head, after passing through the oil discharging path, which defines a communication passage passing through the in-spool axial through hole 14a and the front end center opening 13b.

(c-1) The actuator breathing path communicates the first and second variable volume chambers α, β with the interior of the engine head. The actuator breathing path is a communication passage, which passes through the outer circumferential periphery of the sleeve 13 and the front end outer opening 131, and independent from the oil discharging path 14a, 13b. That is, the actuator breathing path 13, 131 may be substantially separated from the oil discharging path 14a, 13b.

Next, each of the above structures is described with reference to FIGS. 8A, 8B, 8C. FIGS. 8A, 8B, 8C, 11A, 11B, 12A, 12B show exemplified embodiments, from which the magnetism counter member 26 and the blade song 27 are omitted. The magnetism counter member 26 and the blade spring 27 may be arbitrary provided.

The front end portion of the sleeve 13, which communicates with the oil releasing portion 210, is provided with the front end outer opening 131, in addition to the front end center opening 13b, which is described with the OCV 3 according to the exemplified embodiment. The front end outer opening 131 in the present sixth embodiment is a front end portion of an outer breathing groove 32. Specifically, the outer circumferential periphery of the front end of the sleeve 13 has a small diameter portion, which has the outer diameter smaller than the outer diameter of the sleeve 13. The outer diameter of the sleeve 13 is substantially equal to the inner diameter of the attachment hole, which is provided in the engine. The front end portion of the outer breathing groove 32 has an opening at a stepped surface defined between the small diameter portion and the large diameter portion (mentioned later), and the opening is the front end outer opening 131 according to the present sixth embodiment.

The oil discharging path in the OCV 3 according to the sixth embodiment is equivalent to that of the OCV 3 according to the exemplified example. Oil is discharged from the advance chamber output port 13c and the retard chamber output port 13e into the engine head, after passing through the advance-spool drain hole 14f or the retard-spool drain hole 14g, the in-spool axial through hole 14a, and the front end center opening 13b. In the present structure, the oil discharging path is the communication passage passing through the in-spool axial through hole 14a and the front end center opening 13b. In addition, the in-spool axial through hole 14a according to the present sixth embodiment is the axial hole formed by machining work to extend from the front end of the spool 14 to the vicinity of the rear end of the spool 14. The rear end of the in-spool axial through hole 14a is blockaded and configured such that the in-spool axial through hole 14a does not communicate with the interior on the side of the solenoid actuator 12.

As shown in FIGS. 8A, 8B, the outer circumferential periphery of the sleeve 13 has the outer breathing groove 32. The outer breathing groove 32 extends from the front end of the sleeve 13 toward the rear end of the sleeve 13 and communicates with the front end outer opening 131 at the front end of the sleeve 13. The outer breathing groove 32 is configured as a bypass passage of the in-spool axial through hole 14a (oil discharging path). The rear end of the outer breathing groove 32 extends in the sleeve 13 to a portion at the front side of the mount groove of the O ring 28. The bottom portion of the rear end of the outer breathing groove 32 has a breathing hole 33, which communicates the inside of the sleeve 13 with the outside of the sleeve 13. The first variable volume chamber α communicates with the outer breathing groove 32 through the breathing hole 33. The first variable volume chamber α and the second variable volume chamber β communicate with the in-plunger breathing passage 17a through the in-shaft space 25a. In the present structure, the first and second variable volume chambers α, β communicate with the engine head through the breathing hole 33, the outer breathing groove 32, and the front end outer opening 131. Thus, the actuator breathing path 13, 131 is provided as a communication passage independent from the oil discharging path 14a, 13b.

Effect of the Sixth Embodiment

According to the sixth embodiment as described above, in the OCV 3, the center portion and the outer circumferential periphery of the front end of the sleeve 13 are respectively provided with the front end center opening 13b and the front end outer opening 131, which are independent from each other. The oil discharging path is a communication passage communicated with the front end center opening 13b through the in-spool axial through hole 14a. The actuator breathing path is a communication passage communicated with the front end outer opening 131 through the outer breathing groove 32, which is provided in the outer periphery of the sleeve 13. In the present embodiment, only the front end portion of the sleeve 13 is exposed to the inside of the engine head. However, even in the present structure, oil, which passes through the oil discharging path 14a, 13b, can be restricted from flowing directly into the actuator breathing path 13, 131, since the oil discharging path and the actuator breathing path independently communicate with the inside of the engine head.

Furthermore, the actuator breathing path 13, 131 is a passage, which reaches the front end of the sleeve 13 independently from the oil discharging path 14a, 13. Therefore, the actuator breathing path 13, 131 has a large passage length and a large volume. In the present structure, the actuator breathing path 13, 131 extends from the front end outer opening 131 to the first variable volume chamber α, and a large volume of the actuator breathing path 13, 131 can be easily secured. Specifically the volume of the actuator breathing path 13, 131 can be easily determined to be greater than the changes in the volumes of the first variable volume chamber α and the second variable volume chamber β accompanied with the operation of the plunger 17. In the present structure, oil, which flows between the first variable volume chamber α and the actuator breathing path 13, 131 accompanied with the change in the volume, can be substantially regularly held in the actuator breathing path 13, 131, since the actuator breathing path 13, 131 has a large volume. Therefore, newly replaced oil within the amount of oil, which is drawn to the first and second variable volume chambers α, β, can be significantly reduced.

As described above, intrusion of oil to the first and second variable volume chambers α, β is suppressed. Therefore, foreign matters contained in oil can be restricted from intruding into the first and second variable volume chambers α, β. Accordingly the sliding property of the plunger 17 can be maintained, and abrasion in the slidable surface of the plunger 17 can be suppressed. Thus, in the present structure, reliability of the OCV 3 can be enhanced. Consequently, reliability of the OCV 3 can be enhanced.

Seventh Embodiment

The seventh embodiment is described with reference to FIGS. 11A, 11B. In the previous sixth embodiment, the actuator breathing path 13, 131 is independently provided in the exterior of the in-spool axial through hole 14a by providing the outer breathing groove 32 in the outer circumferential periphery of the sleeve 13. On the contrary, according to the present seventh embodiment, an independent actuator breathing path 35 is provided inside of the in-spool axial through hole 14a.

According to the present seventh embodiment, the OCV 3 has the following structure to provide the independent actuator breathing part 35 inside of the in-spool axial through hole 14a.

(a-2) The front end of the sleeve 13 is provided with the front end center opening 13b and the front end outer opening 131. The front end center opening 13b and the front end outer opening 131 are separately provided to the center portion of the sleeve 13 and the outer circumferential periphery of the sleeve 13.

(b-2) A partition member 36 is fixed in the in-spool axial through hole 14a. The partition member 36 partitions off a first space 34 from a second space 35. The first space 34 communicates with the front end outer opening 131. The second space 35 communicates with the front end center opening 13b.

(c-2) Oil is discharged from the advance chamber output port 13c and the retard chamber output port 13e and led into the oil releasing portion 210 through the oil discharging path 34. The oil discharging path 34 is a communication passage, which communicates with the front end outer opening 131 through the first space 34 inside of the in-spool axial through hole 14a.

(d-2) The actuator breathing path 35 communicates the first and second variable volume chambers α, β, which are formed in the solenoid actuator 12, with the oil releasing portion 210. The actuator breathing path 35 is a communication passage, which passes through second through the second space 35 inside of the in-spool axial through hole 14a. The actuator breathing path 35 communicates with the front end center opening 13b, and independent from the oil discharging path 34.

Next, each of the above structures is described with reference to FIGS. 11A, 11B. The front end of the sleeve 13 is provided with the front end center opening 13b and the front end outer opening 131, which are independent from each other. The front end center opening 13b is equivalent to that in the sixth embodiment mentioned above. The front end outer opening 131 in the present seventh embodiment is a notch portion, which communicates a drain hole 37 with the oil releasing portion 210. Furthermore, according to the present seventh embodiment, the spool breathing hole 14b, which is described in the exemplified example, is provided to the rear portion of the spool 14. In addition, a hole is provided in the front end of the shaft 25, such that the rear end of the spool breathing hole 14b communicates with the in-shaft space 25a.

The partition member 36 is in a pipe shape to partition off the inside of the in-spool axial through hole 14a. The partition member 36 defines the first space 34 as the radially outer portion inside of the in-spool axial through hole 14a. The partition member 36 defines the second space 35 as the radially inner portion inside of the in-spool axial through hole 14a. Specifically the partition member 36 is a hollow component which is formed of a metallic plate such as a stainless plate or a steel plate to be in a stepped pipe shape. The partition member 36 includes a large diameter portion and a small diameter portion. The step portion between the large diameter portion and the small diameter portion is located on the front side of the advance-spool drain hole 14f. The large diameter portion is press-fitted to the inner periphery defining the in-spool axial through hole 14a. On the other hand, the rear end of the small diameter portion is press-fitted to the inner periphery defining the spool breathing hole 14b. In the present structure, the first space 34, which is communicated with the advance-spool drain hole 14f and the retard-spool drain hole 14g, is blockaded from the front end center opening 13b by the partition member 36. Thus, the in-shaft space 25a, which is communicated with the first and second variable volume chambers α, β, communicates with the front end center opening 13b through the second space 35.

The front side of the sleeve 13, has the drain hole 37, which regularly communicates the first space 34 with the front end outer opening 131. The drain hole 37 communicates with the front end outer opening 131. The drain hole 37 is provided so as to regularly communicate with the advance-spool drain hole 14f throughout the movable range of the spool 14. The movable range of the spool 14 is between the maximum retard position in FIG. 11A and the maximum advance position in FIG. 11B.

In the present structure, oil is discharged from the advance chamber output port 13c and the retard chamber output port 13e into the engine head, after passing through the advance-spool drain hole 14f and the retard-spool drain hole 14g, the first space 34 in the in-spool axial through hole 14a, and the front end outer opening 131. As described above, the oil discharging path is the communication passage communicating with the front end outer opening 131 through the first space 34 in the in-spool axial through hole 14a.

As described above, the second space 35 (actuator breathing path 35) inside of the partition member 36 communicates the front end center opening 13b with the in-shaft space 25a. The second space 35 (actuator breathing path 35) inside of the partition member 36 is configured as a bypass passage of the oil discharging path 34 in the in-spool axial through hole 14a. In the present structure, the first and second variable volume chambers α, β communicate with the oil releasing portion 210 through the in-shaft space 25a, the second space 35 in the in-spool axial through hole 14a, and the front end center opening 13b. Thus, the actuator breathing path 35 is provided as a communication passage independent from the oil discharging path 34.

Even in the present seventh embodiment, an equivalent effect to that in the sixth embodiment can be obtained, since the oil discharging path 34 and the actuator breathing path 35 respectively communicate independently with the inside of the engine head.

Eighth Embodiment

The eighth embodiment is described with reference to FIGS. 12A, 12B. In the previous seventh embodiment, the advance chamber output port 130, the input port 13d, and the retard chamber output port 13e are located alternately with respect to the sleeve 13, similarly to the sixth embodiment. That is, each hole is provided to each of the advance chamber output port 13c, the input port 13d, and the retard chamber output port 13e alternately in the sleeve 13. On the contrary, in the OCV 3 according to the present eighth embodiment, each of the advance chamber output port 13c, the input port 13d, and the retard chamber output port 13e extends from one side of the sleeve 13 to the other side through the sleeve 13 with respect to the radial direction. Annular grooves, which are independent from each other, are provided to respectively communicate with the advance chamber output port 13c, the input port 13d, and the retard chamber output port 13e. That is, each of the advance chamber output port 13c, the input port 13d, and the retard chamber output port 13e has two through holes, which communicates with each other through the sleeve 13 with respect to the radial direction of the sleeve 13. The two through holes of each of the advance chamber output port 13c, the input port 13d, and the retard chamber output port 13e are communicated with the corresponding annular grooves, which are independent from each other. Each of the annular grooves circumferentially extends on the outer circumferential periphery of the sleeve 13. In the present structure, flexibility in the attachment direction of the spool valve 11 is enhanced.

Specifically, according to the previous sixth embodiment, the outer breathing groove 32 extends in the outer circumferential periphery of the sleeve 13 with respect to the axial direction to configure the oil discharging path to be independent from the actuator breathing path. Accordingly, it is hard to define an annular groove to each of the advance chamber output port 13c, the input port 13d, and the retard chamber output port 13e. On the contrary, according to the present eighth embodiment, the annular groove is provided to each of the advance chamber output port 13c, the input port 13d, and the retard chamber output port 13e. Even in the present structure, the oil discharging path 14a and the actuator breathing path 35 can be configured to be independent from each other via the partition member 36, similarly to the seventh embodiment.

(Modification)

According to the above embodiments, a solenoid actuator 12 is employed as one example of an electric actuator. Alternatively, another electric actuators, which is configured to change the inner volume accompanied with the operation thereof may be employed.

According to the above embodiments, the magnetically attractive stator 22 and the magnetism delivery stator 23 are provided as separate components. Alternatively, the magnetically attractive stator 22 and the magnetism delivery stator 23 may be provided as an integrated stator 18 to define a magnetic cutoff portion and/or a magnetic resistance portion between the magnetically attractive stator 22 and the magnetism delivery stator 23.

Each of the VCT 1 and the hydraulic circuit 2 shown in the above embodiments is one example. The VCT 1 and the hydraulic circuit 2 may have other structures.

Although in the above embodiments, the present characteristic structures are applied to the OCV 3 used for the VVT, the present characteristic structures may be applied to another electric spool valve. For example, the present characteristic structures may be applied to an electric spool valve for hydraulic pressure control of an automatic transmission device or the like used for applications other than the VVT.

The engine oil is an example of hydraulic fluid. The above electric spool valve can be applied to operate fluid other than engine oil.

The above structures of the embodiments can be combined as appropriate.

Various modifications and alternations may be diversely made to the above embodiments without departing from the spirit of the present invention.

What is claimed is:

1. An electric spool valve comprising:
   a sleeve having an input port, an output port, and only one discharge port, the sleeve having an inner periphery defining an insertion hole;
   a spool axially slidable along the inner periphery of the sleeve to control communication among the input port, the output port, and the discharge port; and
   an electric actuator provided to one end of the sleeve to axially exert driving force to the spool,
   wherein the spool has an axial through hole, which axially extends through the spool,
   the spool has one end defining a spool breathing hole,
   the electric actuator has at least one variable volume chamber, which communicates with the discharge port of the sleeve through the axial through hole and the spool breathing hole of the spool, and
   the spool has a communication through hole configured to lead fluid from the output port of the sleeve to the discharge port of the sleeve through the axial through hole of the spool, the electric spool valve further comprising:
a passage partition member provided in the axial through hole to partition the axial through hole and define an in-spool breathing passage, which communicates with the spool breathing hole.

2. The electric spool valve according to claim 1, wherein the discharge port is provided to an other end of the sleeve.

3. The electric spool valve according to claim 2, wherein the passage partition member has an end, which is axially closer to the discharge port than the communication through hole.

4. The electric spool valve according to claim 1, wherein the discharge port opens to atmosphere.

5. The electric spool valve according to claim 1, wherein the in-spool breathing passage is partitioned to have a volume, which is greater than an amount of fluid, which is drawn through the spool breathing hole by breathing accompanied with change in a volume in the electric actuator.

6. The electric spool valve according to claim 1, wherein the passage partition member is in a cylindrical shape having an interior communicating with the at least one variable volume chamber.

7. The electric spool valve according to claim 1,
wherein the passage partition member is in a plate shape, and
the passage partition member circumferentially partitions the axial through hole when being viewed from an axial direction of the axial through hole.

8. The electric spool valve according to claim 1, wherein the passage partition member is fixed to the spool.

9. The electric spool valve according to claim 1, further comprising:
a shaft for transmitting the driving force from the electric actuator to the spool,
wherein the passage partition member is fixed to the shaft.

10. The electric spool valve according to claim 1,
wherein the electric actuator is a solenoid actuator including a coil and a plunger, the coil being configured to generate magnetism when being energized so as to axially actuate the plunger, and
the at least one variable volume chamber includes a first variable volume chamber, which is located on one side of the plunger in the vicinity of the spool, and a second variable volume chamber, which is located on an other side of the plunger,
the electric spool valve further comprising:
a shaft for transmitting movement of the plunger to the spool,
wherein the shaft has an axial center defining an in-shaft breathing passage,
the plunger has an axial center defining an in-plunger breathing passage,
the in-shaft breathing passage communicates with the spool breathing hole at one side and communicates with the in-plunger breathing passage at an other side, and
the shaft has a shaft breathing hole, which is a through hole and communicates the in-shaft breathing passage with the first variable volume chamber.

11. An electric spool valve configured to be communicated with a releasing portion when being inserted to a stationary member, the electric spool valve comprising:
a sleeve having an output port;
a spool having an in-spool axial hole and being axially slidable in the sleeve to control communication between the in-spool axial hole and the output port; and
an electric actuator provided to a rear end of the sleeve to axially exert driving force to the spool, the electric actuator having a variable volume chamber,
wherein the sleeve has a front end portion, which is exposed to the releasing portion when being inserted to the stationary member, and
the front end portion has a center portion and an outer circumferential periphery, which respectively have a front end center opening and a front end outer opening being independent from each other,
the electric spool valve further comprising:
a fluid discharging path configured to communicate with the front end center opening through the in-spool axial hole to lead fluid from the output port to the releasing portion; and
an actuator breathing path communicating with the front end outer opening through an outer circumferential periphery of the sleeve and configured to communicate the variable volume chamber with the releasing portion,
wherein the actuator breathing path is independent from the fluid discharging path.

12. The electric spool valve according to claim 11,
wherein the in-spool axial hole has a front end communicating with the front end center opening,
the in-spool axial hole has a rear end, which is blockaded,
the outer circumferential periphery of the sleeve has an outer breathing groove, which extends from the front end portion of the sleeve to the rear end of the sleeve,
the outer breathing groove has a front end communicating with the front end outer opening, and
the actuator breathing path communicates with the front end outer opening through the outer breathing groove.

13. An electric spool valve configured to be communicated with a releasing portion when being inserted to a stationary member, the electric spool valve comprising:
a sleeve having an output port;
a spool having an in-spool axial hole and being axially slidable in the sleeve to control communication between the in-spool axial hole and the output port; and
an electric actuator provided to a rear end of the sleeve to axially exert driving force to the spool, the electric actuator having a variable volume chamber,
wherein the sleeve has a front end portion, which is exposed to the fluid releasing portion when being inserted to the stationary member, and
the front end portion has a center portion and an outer circumferential periphery, which respectively have a front end center opening and a front end outer opening being independent from each other,
the electric spool valve further comprising:
a partition member provided in the in-spool axial hole to partition the in-spool axial hole into a first space, which communicates with the front end outer opening, and a second space, which communicates with the front end center opening;
a fluid discharging path communicating with the front end outer opening through the first space to lead fluid from the output port to the fluid releasing portion; and
an actuator breathing path communicating with the front end center opening through the second space and configured to communicate the variable volume chamber with the fluid releasing portion,
wherein the actuator breathing path is independent from the fluid discharging path.

14. The electric spool valve according to claim 13,
wherein the partition member is substantially in a pipe shape, the second space is located in the partition member and radially inside of the first space, the partition member communicates with the variable volume chamber at the rear end of the in-spool axial hole, and the actuator breathing path communicates with the front end center opening through the second space.

15. The electric spool valve according to claim 11, wherein the sleeve further has an input port, and the input port and the output port are located alternately with respect to an axial direction of the sleeve.

16. The electric spool valve according to claim 11, wherein the sleeve further has an input port, the input port extends from one side of the sleeve to an other side of the sleeve radially through the sleeve to have two through holes, which communicate with each other radially through the sleeve, the sleeve has an outer circumferential periphery defining an input groove, which circumferentially communicates the two holes of the input port therebetween, the output port extends from the one side of the sleeve to the other side of the sleeve radially through the sleeve to have two through holes, which communicates with each other radially through the sleeve, and the outer circumferential periphery of the sleeve defines an output groove, which circumferentially communicates the two holes of the output port therebetween.

* * * * *